US007372677B2

United States Patent
Kishibata et al.

(10) Patent No.: US 7,372,677 B2
(45) Date of Patent: May 13, 2008

(54) CONTROL APPARATUS FOR INTERNAL COMBUSTION ENGINE-DRIVEN VEHICLE HAVING POWER SUPPLY UNIT

(75) Inventors: Kazuyoshi Kishibata, Numazu (JP); Masahiko Endou, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 322 days.

(21) Appl. No.: 11/175,723

(22) Filed: Jul. 6, 2005

(65) Prior Publication Data

US 2006/0006846 A1 Jan. 12, 2006

(30) Foreign Application Priority Data

Jul. 7, 2004 (JP) ............................. 2004-200797

(51) Int. Cl.
*H02H 3/00* (2006.01)
(52) U.S. Cl. ...................................................... 361/42
(58) Field of Classification Search ................... 361/42
See application file for complete search history.

(56) References Cited

U.S. PATENT DOCUMENTS 5,530,360 A * 6/1996 Kerchaert et al. .......... 324/379
6,014,015 A * 1/2000 Thorne et al. ................ 322/15
6,097,107 A * 8/2000 Ikeda ......................... 307/10.7
6,285,533 B1 * 9/2001 Sakamoto .................... 361/31
6,365,983 B1 * 4/2002 Masberg et al. .......... 290/40 C
6,414,400 B1 * 7/2002 Scott et al. ............... 290/40 C

FOREIGN PATENT DOCUMENTS

JP 2004-040876 2/2004
JP 2004-084932 3/2004

* cited by examiner

*Primary Examiner*—Michael Sherry
*Assistant Examiner*—Christopher J Clark
(74) *Attorney, Agent, or Firm*—Pearne & Gordon LLP

(57) ABSTRACT

A control apparatus for an internal combustion engine-driven vehicle equipped with a power supply unit having an AC generator driven by an internal combustion engine, and a power converter which converts an output voltage from the AC generator into an AC voltage of a certain frequency, which comprises a leakage detection means which detects an occurrence of electric leakage in the power supply unit, a leakage occurrence position identification means which identifies a leakage occurrence position, and an electric shock preventing control means which performs control for preventing electric shock on at least one of the internal combustion engine and the power converter, while allowing a rotational speed of the internal combustion engine to increase to a speed at which travel of the vehicle is enabled, when the occurrence of electric leakage is detected.

11 Claims, 9 Drawing Sheets

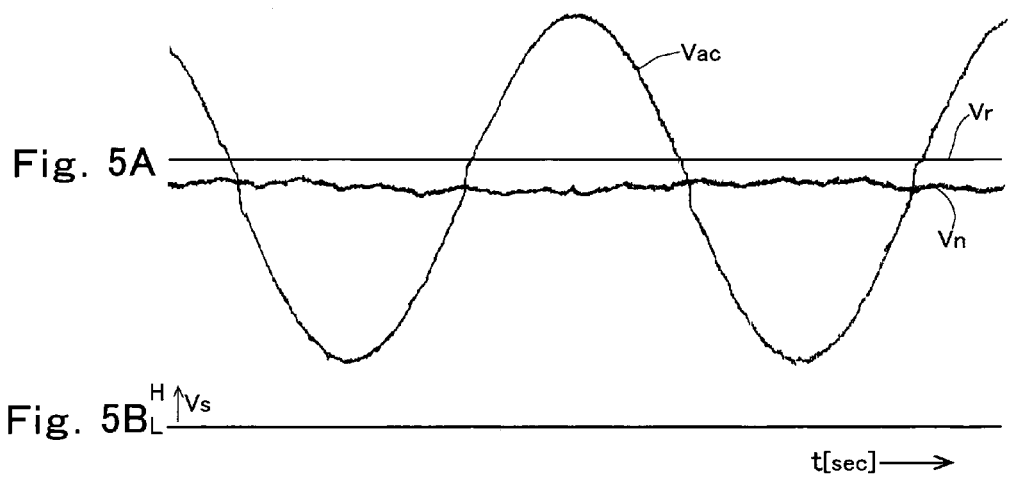
Fig. 5A
Fig. 5B
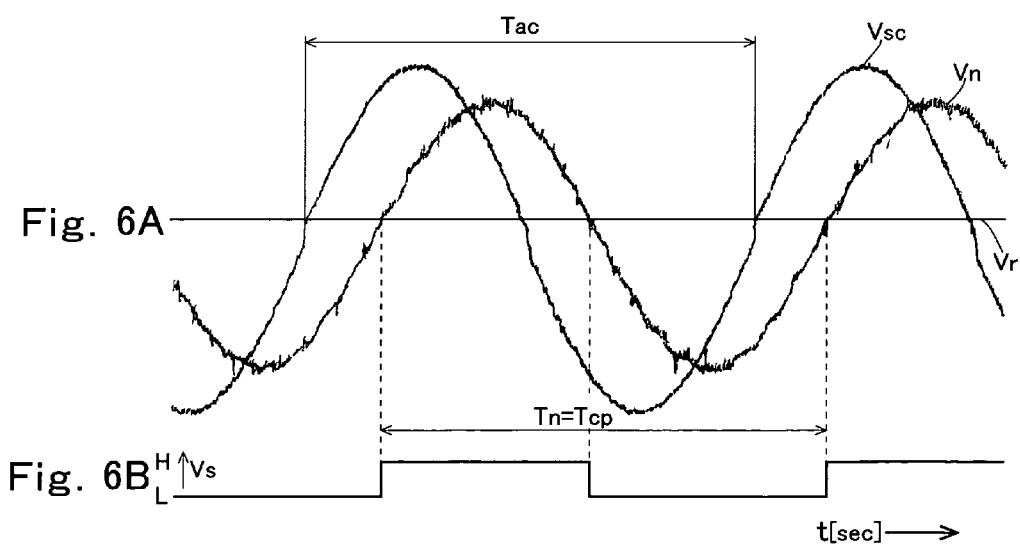
Fig. 6A
Fig. 6B

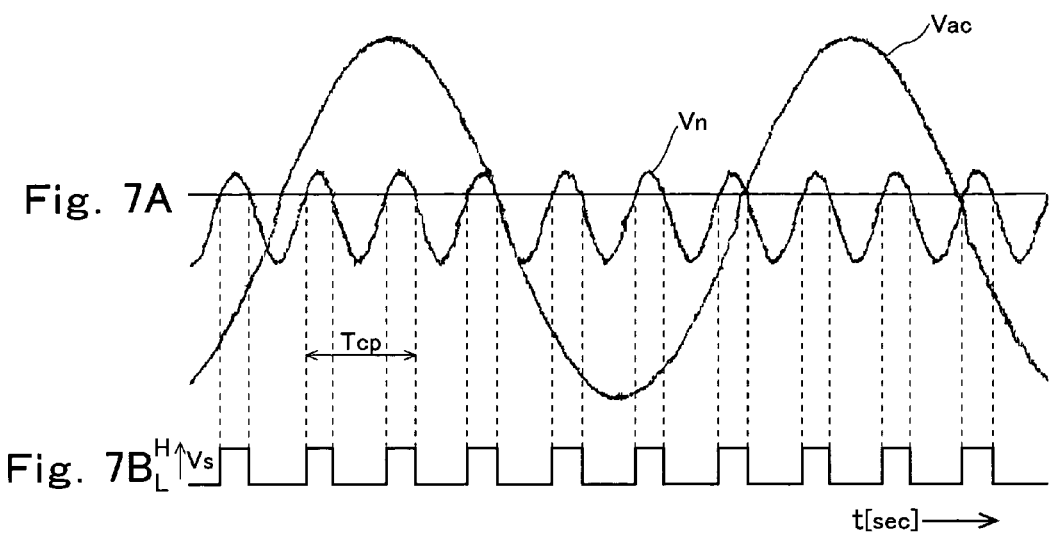
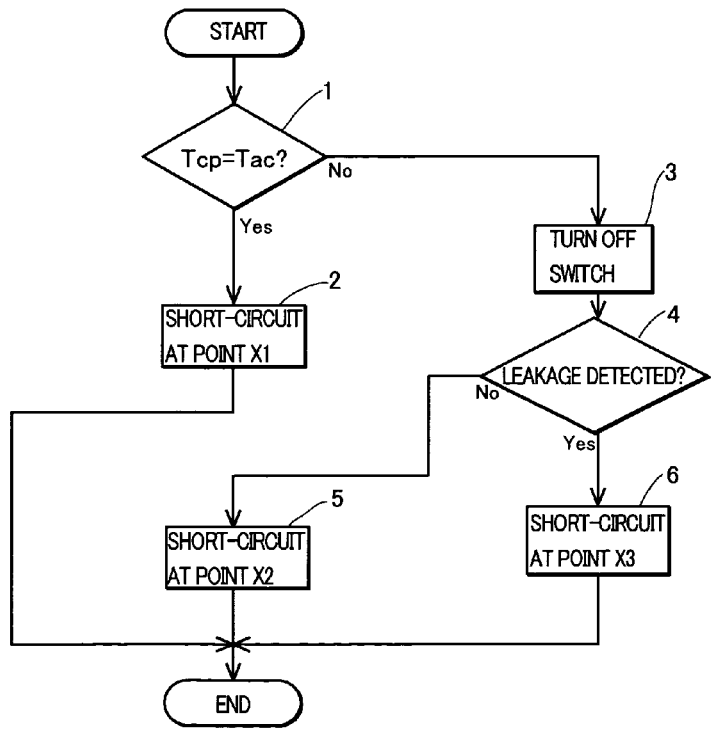

US 7,372,677 B2

CONTROL APPARATUS FOR INTERNAL COMBUSTION ENGINE-DRIVEN VEHICLE HAVING POWER SUPPLY UNIT

TECHNICAL FIELD OF THE INVENTION

The present invention relates to a control apparatus for an internal combustion engine-driven vehicle having a power supply unit which generates an AC output of a certain frequency by using as a power supply an AC generator driven by an internal combustion engine for driving the vehicle.

BACKGROUND OF THE INVENTION

Many of internal combustion engine-driven vehicles, such as all terrain vehicles (ATVs, so-called buggies), tractors and recreational vehicles, provided in recent year as vehicles mainly for traveling over rough ground are equipped with a power supply unit used as a power supply for enabling a power tool, a home electric appliance or the like to be used outdoors. For example, Japanese Patent Laid-Open No. 2004-84932 discloses a vehicle equipped with such a power supply unit.

A power supply unit provided in the above-described kind of vehicle, as disclosed in Japanese Patent Laid-Open No. 2004-40876, has an AC generator driven by an internal combustion engine for driving the vehicle, and a power converter, which converts an AC output from the AC generator changing in frequency and voltage value with the change in rotational speed of the internal combustion engine into an AC output of 100 V or 200 V having a certain commercial frequency (50 or 60 Hz). As the power converter, an inverter unit having a converter for converting the AC output from the AC generator into a DC output and an inverter for converting the DC output from the converter into an AC output of a commercial frequency is ordinarily used.

An internal combustion engine-driven vehicle such as an ATV may travel over puddles or a marshland, and there is a possibility of electric leakage (short-circuit) between the power supply unit and the vehicle body, for example, when a certain portion of the vehicle is submerged in water or wetted. The power supply unit mounted in the vehicle has a wiring to which a high voltage of AC 100 V or 200 V for example is applied. Therefore, there is a risk of electric shock to a person who is touching the vehicle body when the power supply unit is operated in the state where electricity is leaking between the power supply unit and the vehicle body.

Therefore, in this kind of vehicle, it is desirable to provide a device for detecting electric leakage from the power supply unit in order to enable taking measures for prevention of electric shock when electric leakage is detected.

In an internal combustion engine-driven vehicle equipped with a power supply unit, the engine may be stopped for prevention of electric shock when electric leakage from the power supply unit is detected. If the engine is stopped without exception when electric leakage occurs, the vehicle cannot run at the time of occurrence of electric leakage. This means failure to perform the essential function of the vehicle.

However, with an internal combustion engine-driven vehicle such as an ATV or a recreational vehicle frequently driven for traveling over rough ground or mountains in particular, there is a risk of a mishap if the vehicle cannot run. Therefore, it is necessary to avoid as much as possible the occurrence of a condition in which the internal combustion engine cannot be operated.

SUMMARY OF THE INVENTION

An object of the present invention is to provide a control apparatus which suitably controls an internal combustion engine for an internal combustion engine-driven vehicle and a power supply unit provided in the internal combustion engine-driven vehicle according to a position in which an electric leakage occurs, so as to prevent electric shock while avoiding the occurrence of a condition in which the vehicle cannot run.

The present invention is applied to a control apparatus for an internal combustion engine-driven vehicle equipped with a power supply unit having an AC generator driven by an internal combustion engine for driving the vehicle, and a power converter which converts an output voltage from the AC generator into an AC voltage of a certain frequency.

In the present invention, there are provided a leakage detection device having a leakage detection means for detecting the occurrence of electric leakage in the power supply unit and a leakage occurrence position identification means for identifying a position in which an electric leakage has occurred when the occurrence of electric leakage is detected by the leakage detection means, and an electric shock preventing control means for performing control for preventing electric shock on at least one of the internal combustion engine and the power converter according to the result of identification performed by the leakage occurrence position identification means, while allowing the rotational speed of the internal combustion engine to increase to a speed at which travel of the vehicle is enabled, when the leakage detection means detects the occurrence of electric leakage.

The electric shock preventing control means for performing control for preventing electric shock while allowing the rotational speed of the internal combustion engine to increase to a speed at which travel of the vehicle is enabled, when the occurrence of electric leakage is detected, is provided to enable the vehicle to travel even in a situation where an electric leakage occurs, thus preventing a driver or a passenger from becoming a victim of a mishap in a case where an electric leakage occurs when the vehicle is traveling in a secluded place such as a mountainous region.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 5A is a waveform diagram showing the waveform of a detected voltage obtained from a voltage detection circuit when no short-circuit occurs in a power supply unit in the embodiment shown in FIGS. 1 and 2;

FIG. 5B is a waveform diagram showing the waveform of an output from a leakage detection pulse generation circuit when no short-circuit occurs in the power supply unit in the embodiment shown in FIGS. 1 and 2;

FIG. 6A is a waveform diagram showing the waveform of a detected voltage obtained from the voltage detection circuit when an electric leakage occurs in a circuit on the output side of a power converter in the embodiment shown in FIGS. 1 and 2;

FIG. 6B is a waveform diagram showing the waveform of an output from the leakage detection pulse generation circuit when an electric leakage occurs in a circuit on the output side of the power converter in the embodiment shown in FIGS. 1 and 2;

FIG. 7A is a waveform diagram showing the waveform of a detected voltage obtained from the voltage detection circuit when a short-circuit occurs in a circuit between the AC generator and the power converter of the power supply unit in the embodiment shown in FIGS. 1 and 2;

FIG. 7B is a waveform diagram showing the waveform of leakage detection pulses when a short-circuit occurs in the circuit between the AC generator and the power converter of the power supply unit in the embodiment shown in FIGS. 1 and 2;

FIG. 8 is a flowchart showing an algorithm for a task executed by a microprocessor to comprise a leakage occurrence position identification means;

DETAILED DESCRIPTION OF THE PREFERRED EMBODIMENTS

Preferred embodiments of the present invention will be described with reference to the drawings.

A controller in accordance with the present invention is particularly suitable for an internal combustion engine-driven vehicle such as ATVs (buggies), a tractor or a recreational vehicle. A vehicle to which the present invention is applied is equipped with a generator attached to an internal combustion engine for driving the vehicle, and a power supply unit which generates AC power of a certain frequency from an output from the generator, but is not particularly specified in terms of use, structure, type, and so on.

Figure 1:
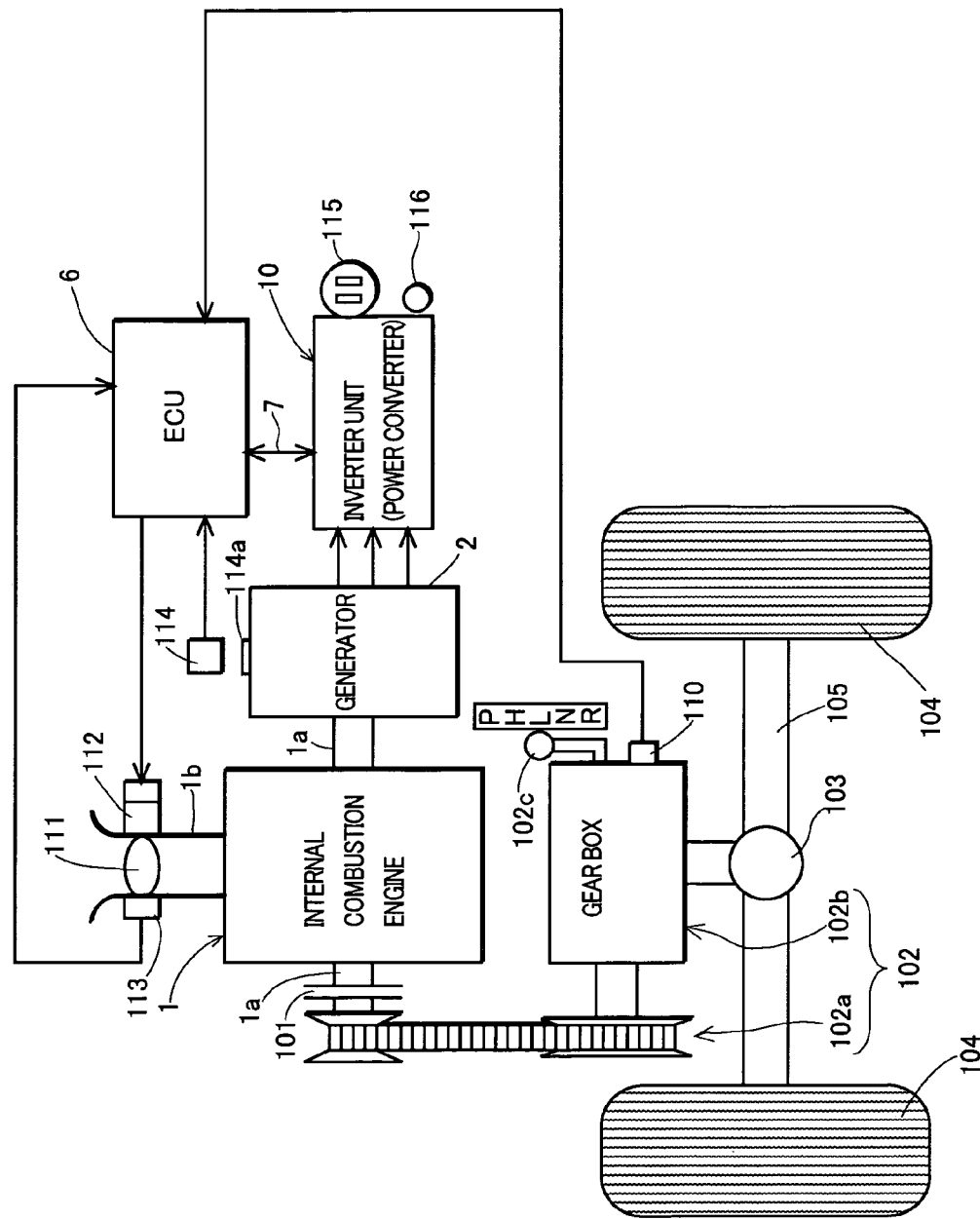
FIG. 1 is a diagram showing the entire construction of an embodiment of the present invention.

FIG. 1 shows an example of the entire construction of an internal combustion engine-driven vehicle to which the present invention is applied. In FIG. 1, a reference numeral 1 denotes an internal combustion engine. One end of a crankshaft 1a of the internal combustion engine 1 is connected to a vehicle shaft 105 to which vehicle driving wheels 104 are connected, through a power transmission unit constituted by a centrifugal clutch 101 and a CVT (continuous-speed transmission) 102 having a belt transmission mechanism 102a and a gear box 102b and through a gear mechanism 103. A gear position selecting lever 102c is attached to the gear box 102b. The gear position can be changed by operating this lever between a parking position P, a high position H, a low position L, a neutral position N and a reverse (backing up) position R. A gear position sensor 110 for detecting the gear position is mounted on the gear box 102b. A rotor of an AC generator 2 is attached to the other end of the crankshaft 1a of the internal combustion engine 1. A stator of the generator 2 is fixed on a mount provided on a case or a cover for the engine. The AC generator 2 shown in the figure is constituted by a magnet-type AC generator used as a power supply for a power supply unit for generating an AC voltage of a commercial frequency when the vehicle is not in operation.

A throttle valve 111 is attached to an intake pipe 1b of the internal combustion engine. An output shaft of an electric actuator 112 is coupled to an operating shaft of the throttle valve 111. An input shaft of a throttle sensor 113 which generates an electrical signal proportional to the opening degree of the throttle valve 111 is also connected to the operating shaft of the throttle valve 111. Injectors (electromagnetic fuel injection valves) (not shown) are mounted in the intake pipe 1b of the internal combustion engine 1 and an ignition plugs (not shown) are mounted in a cylinder head of the internal combustion engine.

A reference numeral 114 denotes a signal generator which generates a pulse signal at a particular crank angle position of the engine to obtain information on the rotation of the engine. The signal generator shown in the figure is comprised so as to generate a pulse signal when detecting the front-end edge, as seen in the direction of rotation of the generator, of a reluctor (inductor) 114a formed by a projection provided on an outer peripheral portion of a rotor yoke of the generator 1 and when detecting the rear-end edge of the reluctor.

A reference numeral 6 denotes an electronic control unit (ECU). The ECU 6 has a microprocessor, an ignition circuit which, when supplied with the ignition signal, performs an ignition operation by applying a high voltage for ignition to the ignition plug, and an injector drive circuit which, when supplied with an injection command signal, supplies a drive current to the injector to inject fuel from the injector.

The ECU 6 is supplied with the output from the signal generator 114 and outputs from various sensors (not shown) for detecting control conditions (the temperature of the engine, atmospheric pressure, and so on) used to control the ignition timing and the fuel injection amount in the internal combustion engine.

The microprocessor in the ECU 6 executes a predetermined program and thereby comprises rotational speed detection means for obtaining the rotational speed of the engine by arithmetic operation from the generation interval between pulse signals output from the signal generator 114 (the time required for rotation of the crankshaft through a certain angle), ignition timing arithmetic operation means for obtaining engine ignition times by arithmetic operation with respect to various control conditions including the rotational speed obtained by arithmetic operation and the throttle valve opening degree, injection amount arithmetic operation means for obtaining the fuel injection amount by arithmetic operation with respect to various control conditions, ignition signal generation means for generating an ignition signal to be supplied to the ignition circuit when an ignition time obtained by arithmetic operation is detected, and injection command signal generation means for generating an injection command signal to be supplied to the injector drive circuit when a predetermined injection start time is detected.

The microprocessor in the ECU 6 also comprises a rotational speed control means for controlling the actuator 112 operating the throttle valve so that the engine rotates at a target rotational speed necessary for maintaining the output from the power supply unit at a rated value when the power supply unit using the generator 2 as a power supply is operated.

A reference numeral 10 denotes an inverter unit comprising a power converter includes, as described below, an AC/DC converter which converts a three-phase AC output from the generator 2 into a DC output, an inverter which converts the DC output obtained from the AC/DC converter into an AC output of a certain frequency, a filter which removes harmonics from the output from the inverter, a controller which controls the inverter, and a leakage detection device which detects occurrence of electric leakage. The controller in the inverter unit 10 has a microprocessor, which is connected to the microprocessor in the ECU 6 via a communication line 7.

The microprocessor provided in the controller of the inverter unit 10 controls the inverter so that the inverter unit outputs an AC voltage of a predetermined frequency. This microprocessor also performs an arithmetic operation to obtain as a target rotational speed an engine rotational speed necessary for maintaining at a rated value an AC voltage applied from the inverter unit to a load, and supplies the target rotational speed to the microprocessor in the ECU via the communication line 7. When the leakage detection device detects the occurrence of leakage, the microprocessor in the controller supplies the microprocessor in the ECU 6 with information on the occurrence of leakage and information on the position in which the leakage has occurred.

A reference numeral 115 denotes a plug receptacle connected to an output terminal of the inverter unit. Electric power is supplied to an external load via this plug receptacle. A reference numeral 116 denotes a mode selection means comprising a switch or the like. The operating mode of the internal combustion engine can be changed between a power generation mode and a traveling mode by operating this mode selection means.

The controller in the inverter unit 10 controls the inverter to generate the AC output from the inverter unit only when the power generation mode is selected by the mode selection means 116 while being supplied by the ECU 6 with information on a detection result from the gear position sensor 110 that the gear is in the neutral position N or the parking position P (i.e., a gear position at which no power is transmitted). The controller in the inverter unit 10 does not control the inverter (the inverter unit does not generate the output) when the traveling mode is selected, or when the power generation mode is selected in a state where the gear position switch is neither at the neutral position nor at the parking position.

The ECU 6 performs control for making the internal combustion engine rotate at the target rotational speed only when the power generation mode is selected by the mode selection means 116 while the state in which the gear is in the neutral portion N or the parking position P is being detected by the gear position sensor 110. When the traveling mode is selected, the ECU 6 performs control of the internal combustion engine necessary for traveling of the vehicle.

Figure 2:
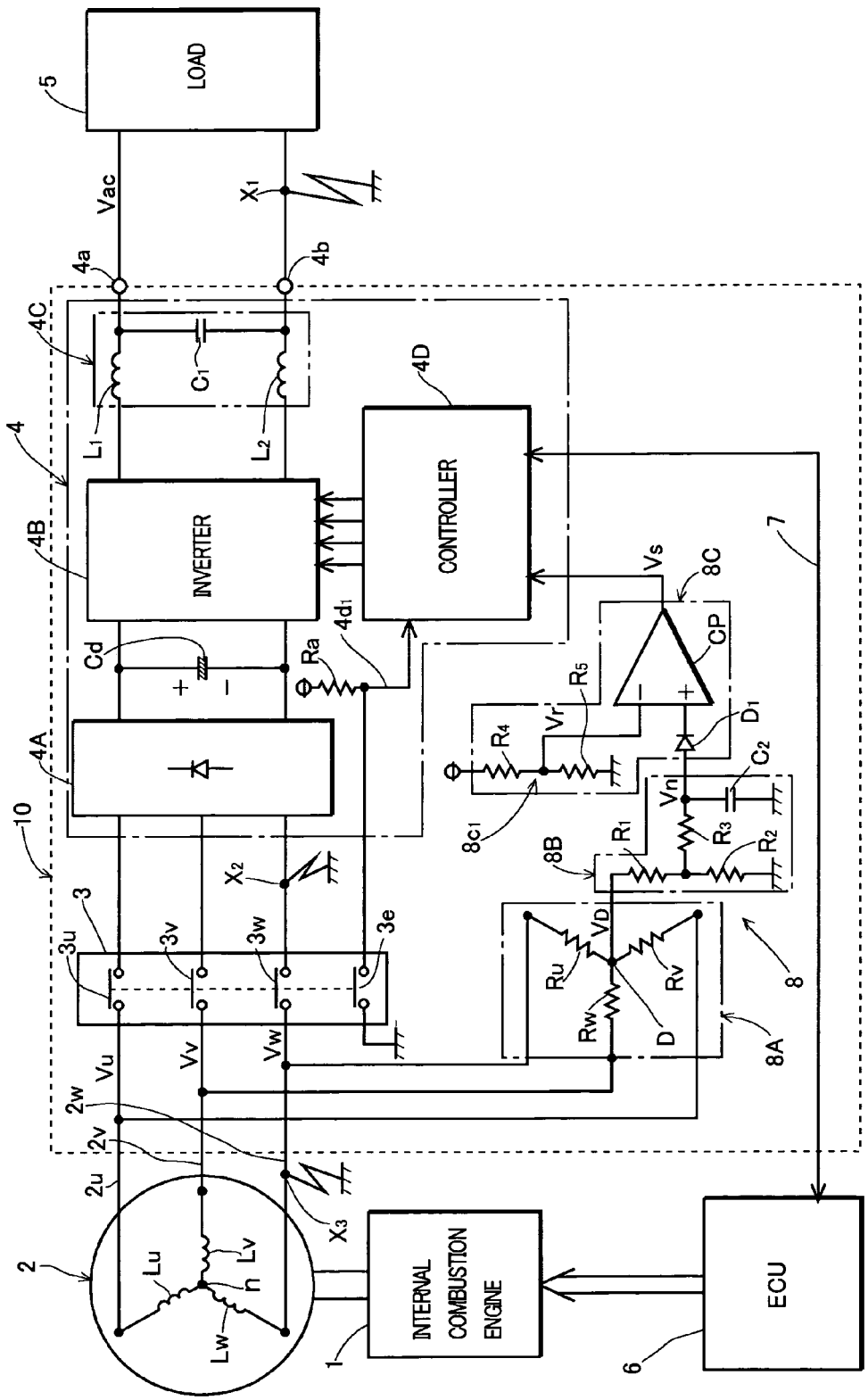
FIG. 2 is a circuit diagram showing details of an inverter unit portion of the embodiment shown in FIG. 1.

FIG. 2 shows an example of the construction of the AC generator 2 and the inverter unit 10. In the example shown in FIG. 2, the AC generator 2 driven by the internal combustion engine 1 is constituted by a magnet-type three-phase AC generator, and the power supply unit is comprised of a power converter 4 to which the three-phase AC output from the generator 2 is input via a three-phase switch 3.

The three-phase AC generator 2 has three-phase armature coils Lu, Lv, and Lw on the stator side. These three-phase armature coils are connected in star connection. In the present invention, each of the three-phase armature coils is disconnected from a ground potential point to enable detection of electric leakage by the leakage detection device. As illustrated, in star connection of the three-phase armature coils Lu, Lv, and Lw, the neutral point of the star connection is disconnected from a grounding circuit. The AC generator 2 is of such a construction that the number of turns of the armature coils is comparatively small and the wave height value of the AC voltage output from the generator 2 when the internal combustion engine is rotating at a rotational speed at which the vehicle can run at a low speed does not reach a value at which electric shock is felt.

The power converter 4 is constituted by a well-known inverter device having an AC/DC converter 4A for converting an input AC voltage into a DC voltage, a power supply capacitor Cd connected to a point between output terminals of the converter 4A, an inverter 4B which converts the DC output from the converter 4A into an AC voltage of a certain frequency, a filter 4C for removing harmonic components from the AC output from the inverter 4B, and a controller 4D for controlling the inverter 4B. A load 5 is connected between output terminals 4a and 4b extending from the filter circuit 4C.

The AC/DC converter 4A is constituted by, for example, a full-wave rectification circuit formed by a three-phase diode bridge circuit, and converts the AC output from the generator 2 into a DC output. The inverter 4B is constituted by a full-bridge-type switch circuit comprised of switching elements such as MOSFETs or IGBTs (insulated-gate bipolar transistors) corresponding to the branches of an H bridge. The filter 4C is constituted by a low-pass filter formed by coils L1 and L2 and a capacitor C1.

Output lines 2u, 2v, and 2w formed of leads from ends of the three-phase armature coils of the AC generator 2 provided opposite from the neutral point are connected to three-phase input terminals of the converter 4A via contacts in the corresponding phase relationship with the three phase coils in the mode switch 3 having four contacts: three-phase contacts 3u, 3v, and 3w and a grounding circuit contact 3e, and the voltage across DC output terminals of the converter 4A (the voltage across the capacitor Cd) is applied between DC input terminals of the inverter 4B. The mode switch 3 is comprised of a relay which is electrically on-off controlled. The mode switch 3 is in the on state when the power generation mode is selected by the mode selection means 116 shown in FIG. 1, and is in the off state when the traveling mode is selected by the mode selection means 116.

The controller 4D has a microprocessor and on-off controls the switching elements in the inverter 4B so that an AC voltage of a certain frequency is output from the filter 4C. The controller 4D has a command signal input terminal 4d1 through which a mode selection command to select the engine operating mode between the vehicle traveling mode and the power generation mode is given. In the illustrated example, the command signal input terminal 4d1 is connected to a positive output terminal of a constant-voltage circuit (not shown) via a resistor Ra and is grounded via the grounding circuit contact 3e of the mode switch 3.

When the power generation mode is selected and when the mode switch 3 is turned on, the potential at the mode signal input terminal 4d1 of the controller 4D is set to the ground potential. A power generation mode selection command is thereby given to the controller 4D. When the vehicle traveling mode is selected and when the mode switch 3 is turned off, the potential at the mode signal input terminal 4*d*1 of the controller 4D is set to a high level. A vehicle traveling mode selection command is thereby given to the controller 4D.

When the controller 4D is given the power generation mode selection command, it controls the switching elements of the inverter 4B so that an AC output of a certain frequency is output from the power converter 4. When the controller 4D is given the vehicle traveling mode selection command, it stops controlling the switching elements of the inverter 4B and stops the output of the AC voltage from the power converter 4. The controller 4D also forms a leakage occurrence position identification means for identifying a place in which an electric leakage exists when the occurrence of the electric leakage is detected by the leakage detection device described below.

The generator 2 is also driven when the vehicle is traveling. The output generated from the generator 2 when the vehicle is traveling is used, for example, to charge a battery, drive pieces of electrical equipment necessary for operating the internal combustion engine and drive electric components such as head lamps provided in the vehicle.

An AC output detection circuit (not shown) for detecting the voltage across the output terminals 4*a* and 4*b* of the power converter 4 is provided. A detection output from this AC output detection circuit is input to the controller 4D. When the microprocessor provided in the controller 4D is given the power generation mode selection command, it arithmetically operates continuously to obtain as a target rotational speed the rotational speed of the internal combustion engine necessary for maintaining at a set value the output voltage of the power converter detected by the AC output detection circuit.

The ECU 6 that controls the internal combustion engine 1 is connected to the controller 4D in the power controller 4 by the communication line 7, as described above. The controller 4D and the ECU 6 have communication means for performing serial communication with each other via the communication line 7. The contents of a mode selection command given to the controller 4D, information on a target engine rotational speed determined by the arithmetic operation performed by the microprocessor in the controller 4D when the power generation mode is selected and information on a leakage occurrence position identified by the leakage occurrence position identification means are supplied to the ECU 6 via the communication line 7.

The ECU 6 controls ignition timing in the internal combustion engine, controls the fuel injection device for supplying fuel to the internal combustion engine 1, and controls the rotational speed of the internal combustion engine 1 so that the rotational speed of the internal combustion engine 1 is maintained at a target rotational speed determined by the arithmetic operation performed by the controller 4D in the time operating the engine by the power generation mode.

Figure 3:
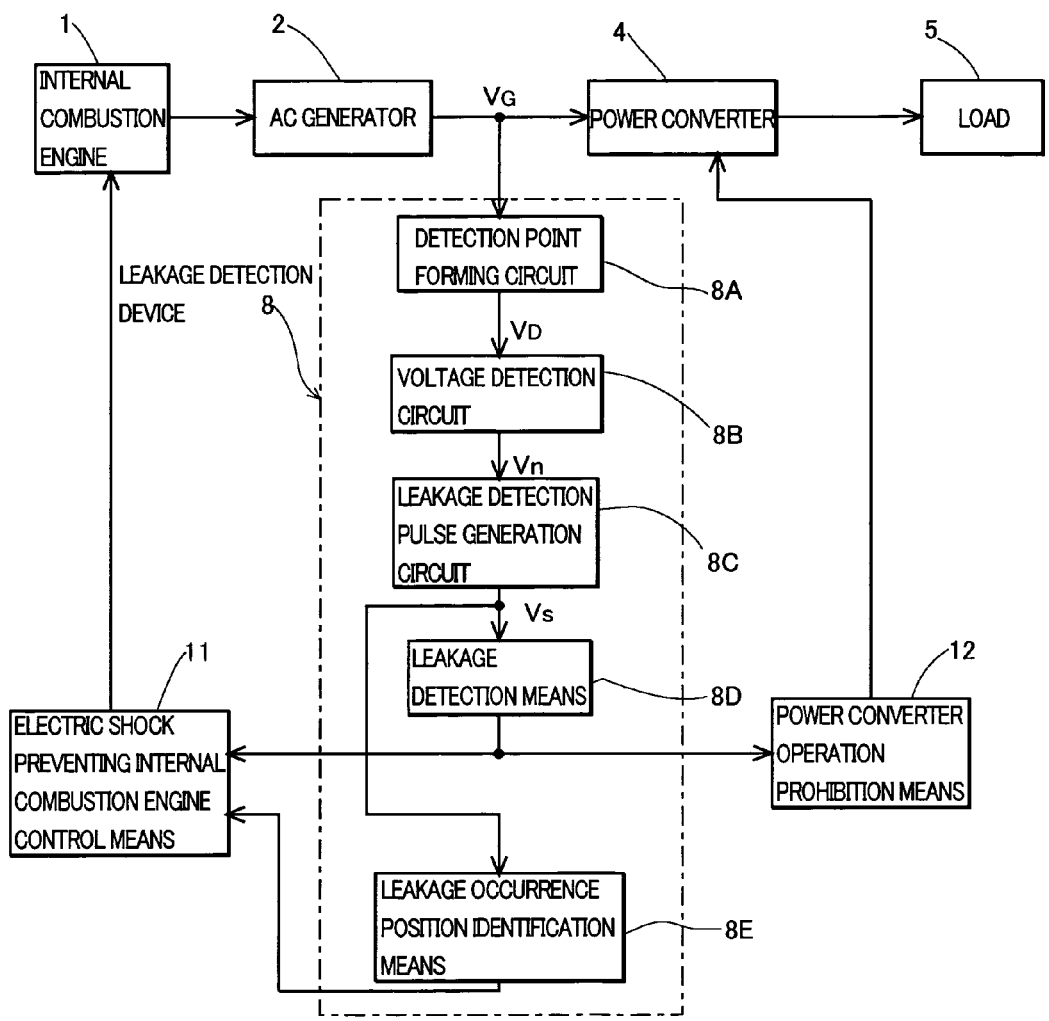
FIG. 3 is a block diagram showing the configuration of a leakage detection device used in the embodiment.

A reference numeral 8 denotes the leakage detection device. A means comprising a portion of the leakage detection device 8 is comprised by making the micro processor in the controller 4D execute a predetermined program. FIG. 3 shows the entire construction of the device including the means comprised of the microprocessor. The leakage detection device 8 includes a detection point forming circuit 8A which forms a detection point D coupled to the three-phase output lines 2*u*, 2*v*, and 2*w* from the AC generator 2 through high-impedance elements, a voltage detection circuit 8B which detects the voltage across the detection point D and the ground, a leakage detection pulse generation circuit 8C which generates leakage detection pulses Vs having different levels in correspondence with a voltage lower than a set reference voltage and a voltage equal to or higher than the reference voltage in detected voltage Vn obtained from the voltage detection circuit 8B, a leakage detection means 8D for detecting the occurrence of electric leakage in the power supply unit when detecting from leak detection pulses Vs an event in which the detected voltage Vn becomes equal to or higher than the reference voltage, and for storing the detection result in a rewritable nonvolatile memory such as an EEPROM, and a leakage occurrence position identification means 8E for identifying a position in which an electric leakage has occurred from the waveform of leakage detection pulses Vs, and for storing the detection result in a rewritable nonvolatile memory.

The detection point forming circuit 8A shown in FIG. 2 is formed of three resistors Ru, Rv, and Rw in star connection having their ends electrically connected respectively to the three-phase output lines 2*u*, 2*v*, and 2*w* of the AC generator 2 and having the other ends connected to a common connection point, which is used as a detection point D. If the resistance values of the resistors Ru, Rv, and Rw are set equal to each other, the potential at the detection point D is substantially equal to the potential at the neutral point n of the armature coils Lu, Lv, and Lw of the generator. That is, the detection point D is a virtual neutral point of the power supply unit. In a state where no short-circuit accident occurs in the power supply unit, therefore, the voltage to ground at the detection point D is substantially zero. However, when a short-circuit accident occurs, a voltage appears between the detection point D and the ground. Needless to say, the resistance values of the resistors Ru, Rv, and Rw are set to a value large enough to avoid any considerable loss in the detection point forming circuit 8A.

The voltage detection circuit 8B shown in the figure is constituted by a resistance voltage dividing circuit formed of resistors R1 and R2 connected in series between the detection point D and the ground, a resistor R3 having its one end connected to the voltage dividing point of this resistance voltage dividing circuit, and a capacitor C2 connected between the other end of the resistor R3 and the ground. The detected voltage Vn proportional to the voltage across the detection point D and the ground is output across the capacitor C2.

The leakage detection pulse generation circuit 8C is a circuit for generating leakage detection pulses Vs having different levels in correspondence with a voltage lower than a set reference voltage and a voltage equal to or higher than the reference voltage in the voltage Vn detected by the voltage detection circuit 8B. The leakage detection pulse generation circuit 8C shown in the figure is comprised of a reference voltage generation circuit 8*c*1 which generates a certain reference voltage Vr for a determination value, and a comparator CP which compares the detection voltage Vn and the reference voltage Vr and generates output signals of different levels in correspondence with a voltage lower than the reference voltage Vr and a voltage equal to or higher than the reference voltage Vr in the detected voltage Vn.

The reference voltage generation circuit 8*c*1 shown in the figure is comprised of a voltage dividing circuit which divides an output voltage from a constant-voltage power supply circuit (not shown) by resistors R4 and R5. The reference voltage Vr obtained by this reference voltage generation circuit is supplied to an inverting input terminal of the comparator CP. Also, the output voltage from the voltage detection circuit 8B is supplied to a noninverting input terminal of the comparator CP via a diode D1. The comparator CP outputs leakage detection pulses Vs having a low level (L level) when the detected voltage Vn is lower than the reference voltage Vr and a high level (H level) when the detected voltage Vn is equal to or higher than the reference voltage Vr. Leakage detection pulses Vs output from the comparator CP are supplied to the microprocessor in the controller 4D.

The reference voltage Vr is set to a value lower than a peak value of the voltage appearing between the detection point D and the ground when an electric leakage occurs in the power supply unit. In this embodiment, the level of the reference voltage Vr is set lower than a possible peak value of the voltage appearing between the detection point D and the ground in either of a case where an electric leakage occurs in a circuit on the output side of the power converter 4 and a case where an electric leakage occurs in the circuit between the AC generator 2 and the power converter 4, thereby ensuring generation of leakage detection pulses Vs in either of the case where an electric leakage occurs in a circuit on the output side of the power converter 4 and the case where an electric leakage occurs in the circuit between the AC generator 2 and the power converter 4.

The microprocessor in the controller 4D detects the occurrence of electric leakage in the power supply unit when detecting from a change in level of leak detection pulses Vs an event in which the detected voltage Vn becomes equal to or higher than the reference voltage Vr. The microprocessor stores the detection result in a rewritable nonvolatile memory such as an EEPROM. The leakage detection means 8D is comprised of the process in which determination processing is performed as described above and the result of determination processing is stored. The microprocessor also performs processing for determining from the period of leakage detection pulses Vs whether an electric leakage has occurred in the circuit between the AC generator 2 and the power converter 4 or in a circuit on the output side of the power converter 4, and stores the result of determination in a rewritable nonvolatile memory. The leakage occurrence position identification means 8E is comprised of the process in which determination processing is performed as described above and the result of determination is stored.

In the illustrated example, the mode switch 3, the component parts of the power converter 4 and the components parts of the leakage detection device 8 are accommodated in a common case to form a unit, i.e., the inverter unit 10.

The detected voltage Vn obtained from the voltage detection circuit 8B by using a magnet-type generator having three-phase armature coils as the AC generator 2 in the embodiment shown in FIG. 2 and by setting the voltage and frequency of the output from the power converter 4 to 100 V and 50 Hz, respectively, was observed with respect to a case where no short-circuit occurred in the power supply unit and a case where a short-circuit occurred in the power supply unit. FIGS. 5 to 7 show the results of this observation. The detected voltage Vn obtained from the voltage detection circuit 8B when no short-circuit occurs in the power supply unit is maintained substantially at the zero level, as shown in FIG. 5A. At this time, the detected voltage Vn cannot reach the reference voltage Vr and, therefore, the output Vs from the comparator CP is maintained at the low level (L level), as shown in FIG. 5B. In FIG. 5A, Vac represents the output voltage of the power converter 4.

In contrast, when a short-circuit occurs at a point X1 in a circuit on the output side of the power converter 4 shown in FIG. 2, the detected voltage Vn has an AC waveform having the same frequency as that of the output voltage Vac from the power converter 4 and the period of the detected voltage Vn coincides with the period Tac of the output voltage Vac from the power converter 4, as shown in FIG. 6A. At this time, the detected voltage Vn exceeds the reference voltage Vr. Accordingly, the comparator CP outputs leakage detection pulses Vs having different levels in correspondence with the level of detected voltage Vn exceeding the reference voltage Vr and the level of detected voltage Vn equal to or lower than the reference voltage. In this embodiment, the comparator CP is arranged so that the leakage detection pulses Vs are high level (H level) when the detected voltage Vn exceeds the reference voltage Vr, and are low level (L level) when the detected voltage Vn is equal to or lower than the reference voltage Vr, as shown in FIG. 6B.

In the power supply unit shown in FIG. 1, if a short-circuit occurs at a point X2 on the downstream side (power converter side) of the mode switch 3 in the circuit between the AC generator 2 and the power converter 4, or at a point X3 on the upstream side (generator side) of the mode switch 3, the detected voltage Vn obtained from the voltage detection circuit 8B has an AC waveform having a frequency equal to that of the output voltage of the AC generator 2, as shown in FIG. 7A. The wave height value of the detected voltage Vn increases with the increase in output voltage of the generator 2.

Also in this case, the detected voltage Vn exceeds the reference voltage Vn, and the comparator CP outputs low-level leakage detection pulses Vs when the detected voltage Vn is lower than the reference voltage Vr, and high-level leakage detection pulses Vs (FIG. 7B) when the detected voltage Vn is equal to or higher than the reference voltage Vr.

As described above, the voltage VD between the detection point D and the ground is maintained substantially at the zero level when no short-circuit occurs in the power supply unit, and has the high level when a short-circuit occurs in the power supply unit. It is, therefore, possible to determine whether or not an electric leakage has occurred in the power supply unit by detecting the voltage VD between the detection point D and the ground and by determining whether or not the detected voltage Vn is equal to or higher than the set reference voltage Vr.

In the case of the arrangement in which the leakage detection pulse generation circuit 8C generates low-level leakage detection pulses Vs when the detected voltage Vn is lower than the reference voltage Vr, as shown in the figure, and high-level leakage detection pulses Vs when the detected voltage Vn is equal to or higher than the reference voltage Vr, it is possible to determine the occurrence of electric leakage in the power supply unit when the microprocessor in the controller 4D detects an event in which the level of leakage detection pulses Vs becomes high level. Thus, the leakage detection means 8D can be comprised of the process in which the level of leakage detection pulses is determined to determine the existence/nonexistence of an electric leakage.

In this embodiment, the microprocessor in the controller 4D is made to perform processing for determining whether or not the period of leakage detection pulses Vs coincides with that of the output voltage of the power converter 4 to comprise the leakage occurrence position identification means 8E is comprised so that a leakage occurrence position is identified. In the case where leakage detection pulses are generated as described above, there is a possibility of occurrence of a certain amount of error between the period of the leakage detection pulses and the period of the detected voltage. In actual processing for determining whether or not the period of leakage detection pulses Vs coincides with that of the output voltage of the power converter 4, therefore, processing for determining whether or not the two periods can be regarded as coinciding with each other is performed. Processing for determining whether or not the period of leakage detection pulses Vs and the period of the output voltage of the power converter 4 can be regarded as coinciding with each other can be performed, for example, by determining whether or not the difference between the detected value of the period of leakage detection pulses Vs and the detected value of the period of the output voltage of the power converter 4 is zero or within a set error range.

That is, the leakage occurrence position identification means 8E in this embodiment is comprised so as to determine the occurrence of electric leakage in a circuit on the output side of the power converter 4 when detecting a state in which the period of the voltage across the detection point D and the ground coincides with the period of the output voltage of the power converter 4, open the switch 3 when detecting a state in which the period of the voltage across the detection point D and the ground does not coincide with the period of the output voltage of the power converter 4, determine the occurrence of electric leakage in the circuit between the AC generator and the power converter when no electric leakage is detected in the state where the switch 3 is open, and determine the occurrence of electric leakage in a circuit existing on the AC generator side as viewed from the switch 3 when the electric leakage is detected in the state where the switch 3 is opened.

FIG. 8 shows a flowchart showing an algorithm for a task executed by the microprocessor to comprise the above-described leakage occurrence position identification means 8E. The task shown in FIG. 8 is executed each time an electric leakage is detected by the leakage detection means. In the case of processing using this algorithm, a determination is first made in step 1 as to whether or not the period Tcp of leakage detection pulses coincides with the period Tac of the output voltage of the power converter. If it is thereby determined that the period Tcp of the leakage detection pulses coincides with the period Tac of the output voltage of the power converter, it is determined in step 2 that an electric leakage has occurred at the point X1 shown in FIG. 2 (in a circuit on the output side of the power converter), and this detection result is stored in the rewritable nonvolatile memory, e.g., an EEPROM. If it is determined in step 1 that the period Tcp of the leakage detection pulses does not coincide with the period Tac of the output voltage of the power converter, the process advances to step 3 to turn off the switch 3 by setting the coil for driving the switch 3 in the non-driving state, and determination is made in step 4 as to whether or not the electric leakage is still being detected. If no further detection result indicating the electric leakage is obtained, the position where the electric leakage has occurred is identified as the point X2 shown in FIG. 2 (the circuit between the switch 3 and the power converter 4) and this identification result is stored in step 5. If it is determined in step 4 that the electric leakage is still being detected after opening the switch 3 in step 3, it is determined in step 6 that the electric leakage has occurred at the point X3 shown in FIG. 2 (a circuit existing on the generator 2 side as viewed from switch 3) and this determination result is stored in the memory.

Since the output frequency of the power converter 4 is constant, simpler processing may suffice for identification of a leakage occurrence position if the period of leakage detection pulses is considered as the period of the output voltage across the detection point and the ground, and if the leakage occurrence position is identified according to whether or not the period of the voltage across the detection point D and the ground coincides with the period of the output voltage from the power converter.

According to the above description of identification a leakage occurrence position, the period of the voltage across the detection point and the ground is detected through leakage detection pulses Vs and a leakage occurrence position is identified according to whether or not the period of the voltage across the detection point and the ground coincides with the period of the output from the power converter. However, a leakage occurrence position may be identified according to whether or not the period of leakage detection pulses Vs (the period of the voltage across the detection point and the ground) coincides with the period of the output voltage of the AC generator 2.

In such a case, the leakage occurrence position identification means 8E may be comprised so as to determine the occurrence of electric leakage in a circuit on the output side of the power converter 4 when detecting a state in which the period of the voltage across the detection point D and the ground does not coincide with the period of the output voltage of the AC generator 2, open the switch 3 when detecting a state in which the period of the voltage across the detection point D and the ground coincides with the period of the output voltage of the AC generator 2, determine the occurrence of electric leakage in the circuit between the switch 3 and the power converter 4 if the leakage detection means 8D detects no occurrence of electric leakage when the switch 3 is opened, and determine the occurrence of electric leakage in a circuit existing on the AC generator side as viewed from the switch 3 if the leakage detection means 8D detects the occurrence of electric leakage even when the switch 3 is opened.

The leakage occurrence position identification means 8E may alternatively be comprised so as to determine the occurrence of electric leakage in a circuit on the output side of the power converter 4 when detecting a state in which the period of the voltage across the detection point D and the ground coincides with the period of the output voltage of the power converter 4, open the switch 3 when detecting a state in which the period of the voltage across the detection point D and the ground coincides with the period of the output voltage of the AC generator 2, determine the occurrence of electric leakage in the circuit between the switch 3 and the power converter 4 if the leakage detection means detects no occurrence of electric leakage when the switch 3 is opened, and determine the occurrence of electric leakage in a circuit existing on the AC generator side as viewed from the switch 3 if the leakage detection means detects the occurrence of electric leakage even when the switch 3 is opened.

Figure 4:
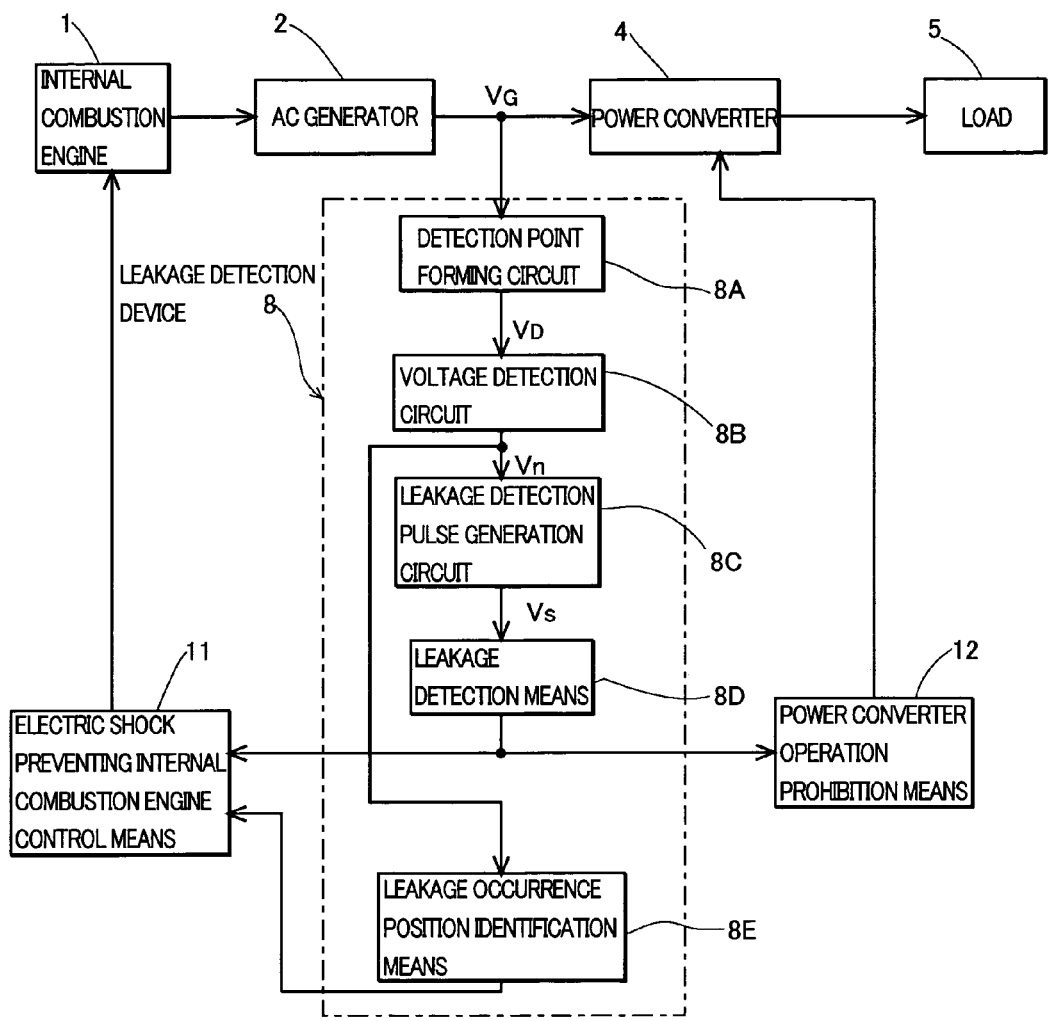
FIG. 4 is a block diagram showing the configuration of another leakage detection device used in the embodiment.

Identification of a leakage occurrence position from the period of leakage detection pulses Vs has been described. According to the present invention, however, identification of a leakage occurrence position may be performed from the period of the voltage across the detection point D and the ground. Therefore, identification of a leakage occurrence position may be performed by performing processing with the microprocessor on the waveform of the voltage detection signal Vn obtained from the voltage detection circuit 8B, as shown in FIG. 4, and by determining whether or not the period of the voltage detection signal Vn coincides with the period of the output voltage of the AC generator or with the period of the output from the power converter.

The period of the output voltage of the AC generator can be obtained by dividing the rotational speed N [rpm] of the internal combustion engine by the number of poles p of the AC generator (by performing an arithmetic operation of N/p).

The embodiment has been described by assuming that the resistance values of the resistors Ru, Rv, and Rw comprising the detection point forming circuit 5A are equal to each other, and that the potential to ground at the detection point D with respect to the ground is substantially equal to the potential to ground at the neutral point N of the AC generator. However, the detection point D is coupled to each output line of the generator through the high-impedance element and may be a point having a potential different from any of the potentials on the output lines of the generator, and the resistance values of the resistors Ru, Rv, and Rw are not necessarily set equal to each other. If the resistance values of the resistors Ru, Rv, and Rw are different from each other, a difference occurs between the voltage to ground at the neutral point of the armature coils and the voltage to ground at the detection point. However, if the armature coils of the AC generator are provided in a non-grounded state, only a substantially zero voltage appears between the detection point D and the ground when no electric leakage occurs, and a high voltage appears between the detection point D and the ground when an electric leakage occurs. Therefore, there is no hindrance to detection of an electric leakage.

In the example shown in FIG. 2, the detection point forming circuit 5A is connected to the output lines of the generator in the inverter unit. Needless to say, the arrangement may alternatively be such that the detection point forming circuit 5A is connected to the output lines of the generator outside the inverter unit.

In this embodiment, the armature coils of the AC generator 2 are star-connected. However, detection of an electric leakage can be performed without any hindrance even in a case where the AC generator has no neutral point, i.e., a case where the armature coils are Δ-connected.

In the present invention, an electric shock preventing internal combustion engine control means 11 and a power converter operation prohibition means 12 are provided as shown in FIG. 3 or 4 to enable the vehicle to travel even when an electric leakage occurs.

The electric shock preventing internal combustion engine control means 11 provided in this embodiment is a means for controlling the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock, when it is determined that there is a risk of receiving an electric shock when touching the vehicle body from a leakage occurrence position identified by the leakage occurrence position identification means 8E and the state of the switch 3, and that the rotational speed of the internal combustion engine is allowed to increase to a speed exceeding the speed limit, when it is determined that there is no risk of receiving an electric shock when touching the vehicle body from a leakage occurrence position identified by the leakage occurrence position identification means 8E and the state of the switch 3.

This electric shock preventing internal combustion engine control means 11 controls the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock, for example, in a situation where the leakage detection means 8D detects an electric leakage while the switch 3 is closed, and in a situation where the leakage occurrence position identification means 8E determines the occurrence of electric leakage in a circuit existing on the AC generator side as viewed from the switch 3, and that the rotational speed of the internal combustion engine is allowed to increase to a speed exceeding the speed limit in a situation where the leakage occurrence position identification means determines the occurrence of electric leakage in a circuit existing on the power converter side as viewed from the switch 3 while the switch 3 is opened.

The power converter operation prohibition means 12 is a means for prohibiting the power converter 4 from producing an output when the leakage detection means 8D detects the occurrence of electric leakage.

Figure 9:
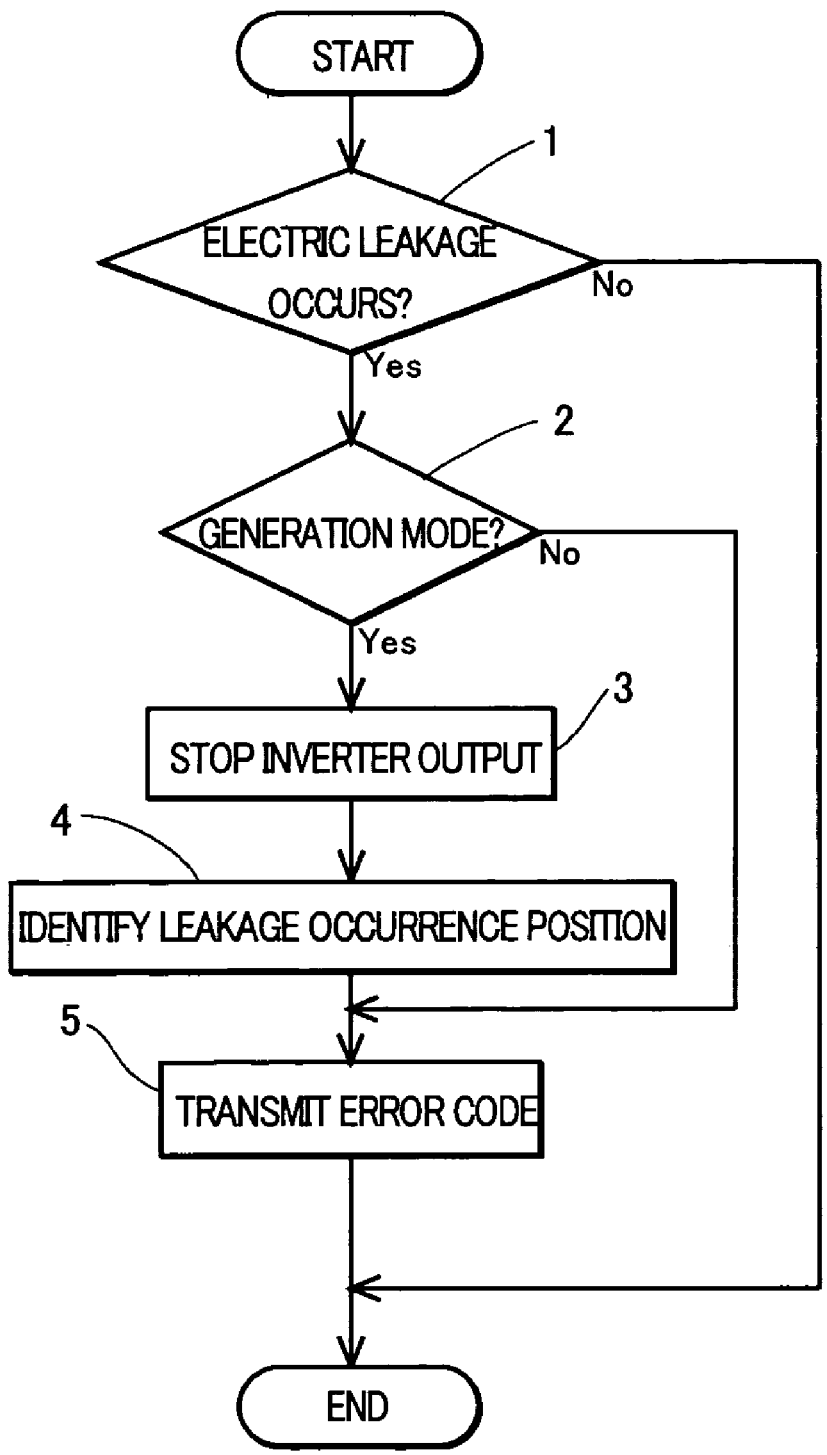
FIG. 9 is a flowchart showing an algorithm for a task executed by a microprocessor in a controller in the inverter unit to comprise a during-leakage power converter operation prohibition means and the leakage occurrence position identification means.
Figure 10:
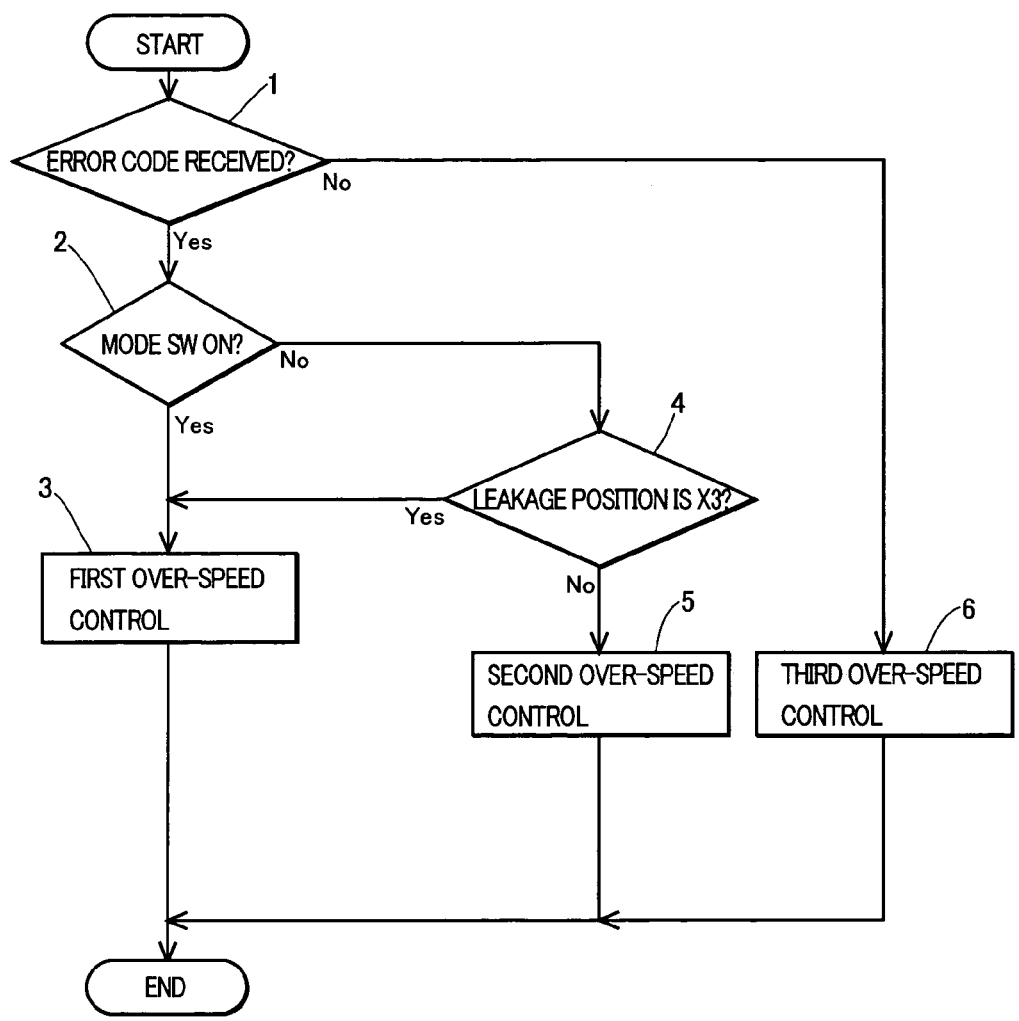
FIG. 10 is a flowchart showing an algorithm for a task executed by a microprocessor in an ECU to comprise an electric shock preventing internal combustion engine control means.

FIGS. 9 and 10 show algorithms for tasks executed by the microprocessor in the controller of the power converter and the microprocessor in the ECU 6 to comprise the above-described electric shock preventing internal combustion engine control means 11 and power converter operation prohibition means 12.

FIG. 9 shows the algorithm for the task executed at small time intervals by the microprocessor in the controller 4D of the power converter. In the task based on this algorithm, a determination is first made in step 1 as to whether or not the leakage detection means 8D has detected the occurrence of electric leakage. If it is thereby determined that the leakage detection means 8D has detected no occurrence of electric leakage, this task ends without execution of any subsequent operation. If it is determined in step 1 that the leakage detection means 8D has detected the occurrence of electric leakage, the process advances to step 2 and a determination is made as to whether or not the selected mode is the power generation mode. If the selected mode is the power generation mode (the switch 3 is closed), the process advances to step 3 and output from the inverter 4B is stopped by stopping the supply of the drive signal to the switching elements of the inverter 4B. The power converter operation prohibition means 12 for prohibiting the power converter 4 from producing an output when the leakage detection means 8D detects the occurrence of electric leakage is comprised of the steps 1 to 3.

After output from the inverter has been stopped in step 3, identification of a leakage occurrence position is performed in step 4 by the algorithm shown in FIG. 8. After identification of a leakage occurrence position, the process advances to step 5 and an error code signal containing information on the occurrence of electric leakage and information as to identification of the leakage occurrence position as one of the points X1, X2, and X3 is supplied from the microprocessor in the controller 4D to the microprocessor in the ECU 6. If it is determined in step 2 that the selected mode is not the power generation mode (the switch 3 is opened), the process moves to step 5 without execution of steps 3 and 4 and the error code signal containing the information on the occurrence of electric leakage and the information on the leakage occurrence position stored in the memory is transmitted to the microprocessor in the ECU. The leakage occurrence position identification means is comprised of step 4, and a leakage information transmission means for transmitting a leakage information to ECU including information on the occurrence of electric leakage and information on a leakage occurrence position is comprised of step 5.

FIG. 10 shows the algorithm for the task executed at small time intervals by the microprocessor in the ECU. In the task based on this algorithm, a determination is first made in step 1 as to whether or not the error code signal has been received from the controller 4D. If it is thereby determined that the error code signal has been received, the process advances to step 2 and a determination is made as to whether or not the switch 3 is closed. If it is determined that the switch 3 is closed, the process advances to step 3 and first over-speed control for limiting the rotational speed of the internal combustion engine to a speed equal to or lower than a first speed limit. This first speed limit is set higher than the lower limit value of the rotational speed of the internal combustion engine necessary for enabling travel of the vehicle (a clutch-in speed, i.e., a rotational speed of the internal combustion engine at which a centrifugal clutch 101 is engaged) and lower than the upper limit value of the rotational speed of the internal combustion engine at which the AC generator 2 generates an output of a voltage value with no risk of electric shock.

If it is determined in step 2 that the switch 3 is opened (the traveling mode is selected), the process moves to step 4 and a determination is made as to whether or not the identified leakage occurrence position is the point X3 (a circuit existing on the generator side as viewed form the switch 3). If it is thereby determined that the identified leakage occurrence position is the point X3, the process advances to step 3 and the first over-speed control for limiting the rotational speed of the internal combustion engine to a speed equal to or lower than the first speed limit set higher than the lower limit value of the rotational speed of the internal combustion engine necessary for enabling travel of the vehicle and lower than the upper limit value of the rotational speed of the internal combustion engine at which the AC generator 2 generates an output of a voltage value with no risk of electric shock.

If it is determined in step 4 that the identified leakage occurrence position is not the point X3 (the point X1 or the point X2), the process advances to step 5 and second over-speed control for limiting the rotational speed of the internal combustion engine to a speed equal to or lower than a second speed limit. The second speed limit is set sufficiently higher than the first speed limit. In a state where the second over-speed control is performed, the rotational speed of the internal combustion engine is allowed to increase to a speed exceeding the first speed limit. In this state, therefore, the rotational speed of the engine can be increased to the speed necessary for enabling travel of the vehicle comparable to steady-state travel. When the switch 3 is opened, no-short-circuit current flows to the vehicle body even in the case of electric leakage at the point X1 or X2, and there is no risk of electric shock. Therefore, there is no problem with increasing the rotational speed of the internal combustion engine to a speed at which the vehicle can travel in a steady state.

If it is determined in step 1 that the error code signal has not been received (no electric leakage has occurred), the process advances to step 6 and third over-speed control is performed. In the third over-speed control, a speed limit is set higher than the second speed limit.

Step 6 may be removed by setting the speed limit of the engine when no electric leakage occurs equal to the speed limit in the second over-speed control, and a transition to step 5 may be made when it is determined in step 1 that the error code signal has not been received.

The electric shock preventing internal combustion engine control means for controlling the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator 2 generates an output of a voltage value with no risk of electric shock in a situation where the leakage detection means 8D detects an electric leakage while the switch 3 is closed, and in a situation where the leakage occurrence position identification means 8E determines the occurrence of electric leakage in a circuit existing on the AC generator side as viewed from the switch 3, and that the rotational speed of the internal combustion engine is allowed to increase to a speed exceeding the speed limit in a situation where the leakage occurrence position identification means 8E determines the occurrence of electric leakage in a circuit existing on the power converter side as viewed from the switch 3 while the switch 3 is opened is comprised of the task shown in FIG. 10.

In a case where a battery for supplying power to the controller 4D and the ECU is charged by the output from the generator 2, it is preferred that the upper limit value of the voltage at which substantially no electric shock can be received should be set to a selected voltage equal to or higher than the battery voltage (12 V) in order to prevent exhaustion of the battery during traveling.

The electric shock preventing internal combustion engine control means 11 is not limited to the above-described arrangement. For example, in a case where the during-leakage power converter operation prohibition means for prohibiting the power converter 4 from producing an output when the leakage detection means 8D detects the occurrence of electric leakage is provided, the electric shock preventing internal combustion engine control means may be comprised so as to limit the rotational speed of the internal combustion engine to a speed limit set higher than the lower limit value of the rotational speed of the internal combustion engine necessary for enabling travel of the vehicle and lower than the upper limit value of the rotational speed of the internal combustion engine at which the AC generator 2 generates an output of a voltage value with no risk of electric shock in a situation where the leakage detection means 8D detects an electric leakage while the switch 3 is closed, and in a situation where the leakage occurrence position identification means 8E determines the occurrence of electric leakage in a circuit existing on the AC generator 2 side as viewed from the switch 3, and allow the rotational speed of the internal combustion engine to exceed the speed limit in a situation where the leakage occurrence position identification means 8E determines the occurrence of electric leakage between the switch 3 and the power converter 4 while the switch 3 is opened, and in a situation where the leakage occurrence position identification means determines the occurrence of electric leakage in a circuit on the output side of the power converter.

An electric shock preventing switching-off means (not shown) for forcibly opening the switch 3 when the leakage detection means 8D detects an electric leakage, and maintaining the switch 3 in the opened state while the leakage is being detected may also be provided. If such a switching-off means is provided, the electric shock preventing internal combustion engine control means may be comprised so as to limit the rotational speed of the internal combustion engine to a speed limit set higher than the lower limit value of the rotational speed of the internal combustion engine necessary for enabling travel of the vehicle and lower than the upper limit value of the rotational speed of the internal combustion engine at which the AC generator 2 generates an output of a voltage value with no risk of electric shock in a situation where the leakage occurrence position identification means 8E determines the occurrence of electric leakage in a circuit existing on the AC generator side as viewed from the switch 3, and allow the rotational speed of the internal combustion engine to exceed the speed limit in a situation where the leakage occurrence position identification means determines the occurrence of electric leakage in a circuit existing on the power converter side as viewed from the switch.

The above-described arrangement ensures that a driver can drive the vehicle with no risk of receiving an electric shock even when an electric leakage occurs, thus eliminating the risk of a driver or a passenger being unable to return home and becoming a victim of a mishap in a case where an electric leakage occurs when the vehicle is traveling in a secluded place such as a mountainous region.

In the above-described embodiment, the power converter operation prohibition means 12 is comprised so as to prohibit the power converter from operating when the leakage detection means detects an electric leakage. The power converter operation prohibition means 12 may alternatively be comprised so as to prohibit the power converter from operating when the leakage occurrence position identification means 8E determines the occurrence of electric leakage in a circuit on the output side of the power converter 4 while the switch 3 is closed.

If the power converter operation prohibition means 12 is comprised in this way, the electric shock preventing internal combustion engine control means 11 may be comprised of a means for controlling the internal combustion engine so that the rotational speed of the internal combustion engine limited to a speed limit which is set higher than the lower limit value of the rotational speed of the internal combustion engine necessary for enabling travel of the vehicle and lower than the upper limit value of the rotational speed of the internal combustion engine at which the AC generator 2 generates an output of a voltage value with no risk of electric shock in a situation where the leakage occurrence position identification means 8E determines the occurrence of electric leakage between the AC generator 2 and the power converter 4 while the switch 3 is closed, and in a situation where the leakage occurrence position identification means 8E determines the occurrence of electric leakage in a circuit existing on the AC generator 2 side as viewed from the switch 3 while the switch 3 is opened, and that the rotational speed of the internal combustion engine is allowed to increase to a speed exceeding the speed limit in a situation where the leakage occurrence position identification means 8E determines the occurrence of electric leakage between the switch 3 and the power converter 4 while the switch 3 is opened, and in a situation where the leakage occurrence position identification means determines the occurrence of electric leakage in a circuit on the output side of the power converter while the power converter is being prohibited from operating.

Figure 11:
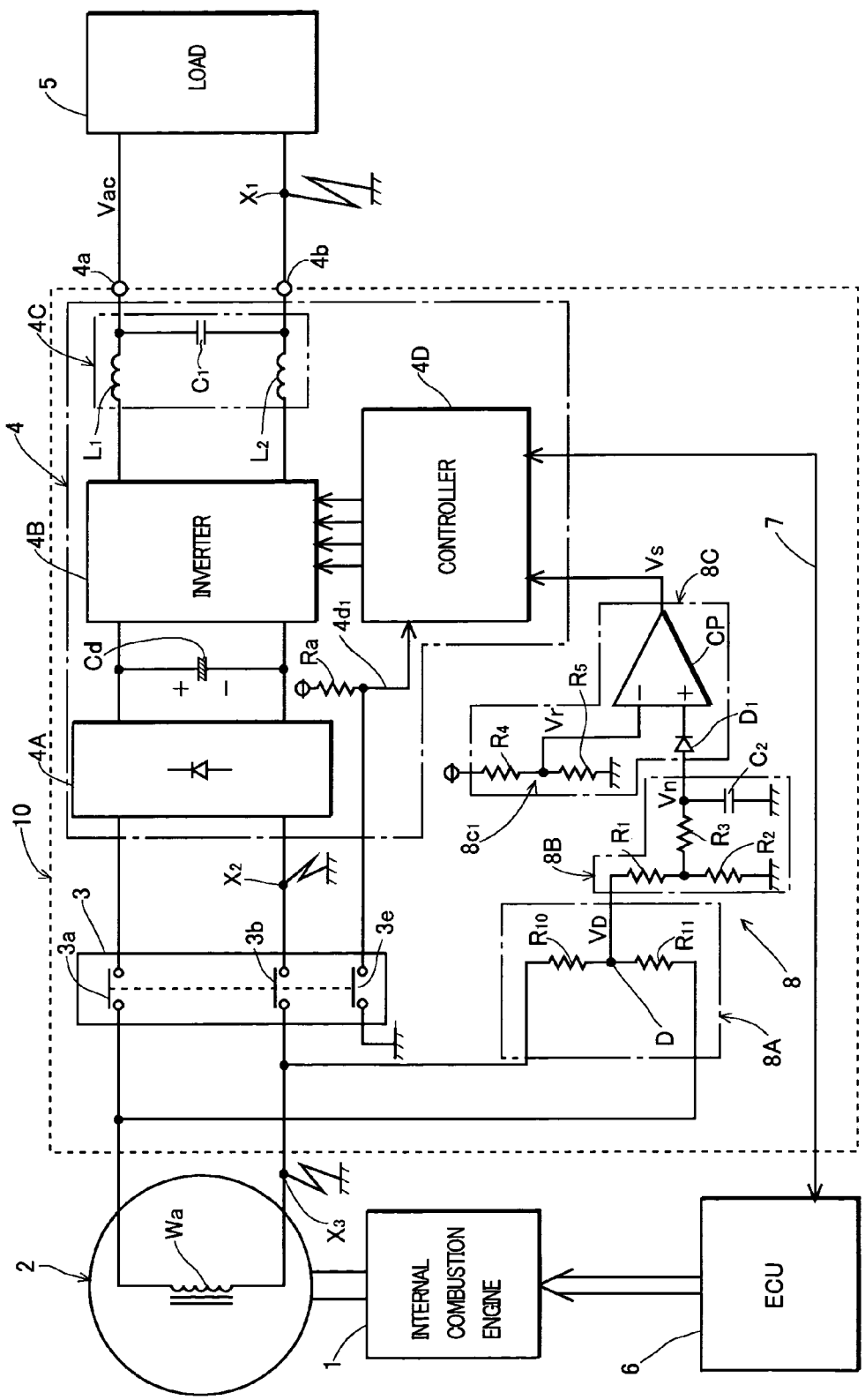
FIG. 11 is a circuit diagram showing the configuration of an inverter unit portion in another embodiment of the present invention.

While in the above-described embodiment a three-phase AC generator is used as the AC generator 1, the present invention can also be applied to a case in which a single-phase AC generator having a single-phase armature coil Wa having two ends provided in a non-grounded state is used as the AC generator 2, as shown in FIG. 11. In the case of using the single-phase AC generator as the AC generator 2, a resistance voltage dividing circuit formed of a series circuit of resistors R10 and R11 having a sufficiently large resistance value is connected between two output lines of the generator 2, and a detection point forming circuit 8A is comprised of this resistance voltage dividing circuit, a detection point D being set at the voltage dividing point of the resistance voltage dividing circuit. The output from the generating coil Wa is input to a power converter circuit 4 via contacts 3a and 3b of a mode switch 3. In this embodiment, the converter 4A in the power converter 4 is formed of a single-phase full-wave rectification bridge circuit. The other components of this embodiment are the same as those in the embodiment shown in FIG. 1.

Also in the embodiment shown in FIG. 11, the resistance values of the resistors R10 and R11 may be equal to or different from each other. A potential difference relationship may suffice in which the potential at the detection point D is different from each of the potentials on the two output lines of the generator.

In each of the above-described embodiments, the detection point D is coupled to each output line of the AC generator through a resistor. However, a point which is coupled to each output line of the AC resistor through a high-impedance element, which has a potential different from each of the potentials on the output lines of the generator, and at which a zero-phase voltage with respect to the ground potential portion when a short-circuit occurs in the power supply unit may suffice as the detection point D. Accordingly, the high-impedance elements for coupling between the detection point D and the output lines of the generator are not limited to resistors.

In the above-described embodiment, in the case where the switch 3 is provided between the AC generator 2 and the power converter 4, a determination is made as to whether a leakage occurrence position is on the upstream side (generator side) of the switch 3 or on the downstream side (power converter side) of the switch 3, and control for prevention of electric shock is performed according to the result of this determination and the state of the switch 3. However, control for prevention of electric shock may be performed without considering the switch 3, while the travel of the vehicle is enabled at the time of occurrence of electric leakage.

That is, in a case where an internal combustion engine-driven vehicle equipped with a power supply unit having an AC generator driven by an internal combustion engine and a power converter which converts an output voltage from the AC generator into an AC voltage of a certain frequency is controlled, an apparatus for controlling the internal combustion engine-driven vehicle is comprised of a leakage detection device 8 having a leakage detection means 8D for detecting the occurrence of leakage in the power supply unit and a leakage occurrence position identification means 8E for identifying a position in which an electric leakage has occurred when the electric leakage is detected by the leakage detection means, and an electric shock preventing control means for performing control for preventing electric shock on at least one of the internal combustion engine and the power converter according to the result of identification performed by the leakage occurrence position identification means, while allowing the rotational speed of the internal combustion engine to increase to a speed at which travel of the vehicle is enabled, when the leakage detection means detects the occurrence of electric leakage.

If the control apparatus is comprised as described above, the power converter operation prohibition means 12 shown in FIG. 3 is comprised so as to prohibit the power converter 4 from operating when the leakage occurrence position identification means 8E determines the occurrence of electric leakage in a circuit on the output side of the power converter 4, or when the leakage detection means 8D detects the occurrence of electric leakage. Also, the electric shock preventing internal combustion engine control means 11 is comprised of a means for controlling the internal combustion engine so that the rotational speed of the internal combustion engine is limited to a speed limit which set higher than the lower limit value of the rotational speed of the internal combustion engine necessary for enabling travel of the vehicle and lower than the upper limit value of the rotational speed of the internal combustion engine at which the AC generator 2 generates an output of a voltage value with no risk of electric shock in a situation where the leakage occurrence position identification means 8E determines the occurrence of electric leakage between the AC generator 2 and the power converter 4, and that the rotational speed of the internal combustion engine is allowed to exceed the speed limit in a situation where the leakage occurrence position identification means 8E determines the occurrence of electric leakage in a circuit on the output side of the power converter 4, and where the power converter operation inhibition means 12 inhibits the power converter from operating. The electric shock preventing control means is comprised of this electric shock preventing internal combustion engine control means 11 and the power converter operation inhibition means 12.

As described above, control for preventing electric shock may be performed on at least one of the internal combustion engine and the power converter on the basis the result of identification performed by the leakage occurrence position identification means, without considering the switch, while the rotational speed of the internal combustion engine is allowed to increase to a speed at which travel of the vehicle is enabled. In this way, control for preventing electric shock can be performed while enabling travel of the vehicle when electric leakage occurs, even in a case where the switch 3 is not provided.

While an inverter unit is used as a power converter in each of the above-described embodiments, the present invention can also be applied to a case in which any other power converter such as a cycloconverter is used.

The present invention has been described with respect to what is presently considered to be preferred embodiments. The construction of the present invention disclosed in this specification is summarized below.

The present invention is applied to a control apparatus for an internal combustion engine-driven vehicle equipped with a power supply unit having an AC generator driven by an internal combustion engine for driving the vehicle, and a power converter which converts an output voltage from the AC generator into an AC voltage of a certain frequency.

The present invention is provided with a leakage detection device having a leakage detection means for detecting the occurrence of electric leakage in the power supply unit and a leakage occurrence position identification means for identifying a position in which an electric leakage has occurred when the occurrence of electric leakage is detected by the leakage detection means, and an electric shock preventing control means for performing control for preventing electric shock on at least one of the internal combustion engine and the power converter according to the result of identification performed by the leakage occurrence position identification means, while allowing the rotational speed of the internal combustion engine to increase to a speed at which travel of the vehicle is enabled, when the leakage detection means detects the occurrence of electric leakage.

The electric shock preventing control means is comprised of, for example, a power converter operation inhibition means for inhibiting the power converter from operating when the leakage occurrence position identification means determines the occurrence of electric leakage, and an electric shock preventing internal combustion engine control means for controlling the rotational speed of the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock in a situation where the leakage occurrence position identification means determines the occurrence of electric leakage between the AC generator and the power converter, and that the rotational speed of the internal combustion engine is allowed to exceed the speed limit in a situation where the leakage occurrence position identification means determines the occurrence of electric leakage in a circuit on the output side of the power converter, and where the power converter operation inhibition means inhibits the power converter from operating.

In the control means comprised as described above, the power converter operation inhibition means is comprised so as to inhibit the power converter from operating when the leakage occurrence position identification means determines the occurrence of electric leakage in a circuit on the output side of the power converter. However, the power converter operation inhibition means may alternatively be comprised so as to inhibit the power converter from operating when the leakage detection means detects the occurrence of electric leakage.

In power supply units provided in internal combustion engine-driven vehicles, a switch is provided between the AC generator driven by the internal combustion engine and the power converter, and is closed when the power supply unit is operated. In a case where the present invention is applied to a control apparatus for an internal combustion engine-driven vehicle equipped with such a power supply unit, the control apparatus is provided with a leakage detection device having a leakage detection means for detecting the occurrence of electric leakage in the power supply unit and a leakage occurrence position identification means for identifying a position in which an electric leakage has occurred when the occurrence of electric leakage is detected by the leakage detection means, and an electric shock preventing internal combustion engine control means for controlling the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock in a case where it is determined that there is a risk of receiving electric shock when touching the vehicle body from a leakage occurrence position identified by the leakage occurrence position identification means and the state of the switch, and that the rotational speed of the internal combustion engine is allowed to increase to a speed exceeding the speed limit in a case where it is determined that there is no risk of receiving electric shock when touching the vehicle body from a leakage occurrence position identified by the leakage occurrence position identification means and the state of the switch.

"A voltage value with no risk of electric shock" is not uniquely determined but arbitrarily set. However, if the vehicle is equipped with a battery used as a power supply for driving an ECU, an ignition device and so on, and if the battery is charged with the output from the AC generator, it is preferable to set the "voltage value with no risk of electric shock" to a value equal to or higher than the battery voltage in order to prevent exhaustion of the battery during traveling.

In the case where the switch is provided between the AC generator and the power converter, the switch may be opened if a position in which an electric leakage has occurred is located on the downstream side (power converter side) of the switch. The vehicle is thereby enabled to travel without causing an electric shock, even if the rotational speed of the engine is not particularly limited. Thus, the vehicle is enabled to travel without limiting the vehicle speed, even if no particular control is performed for inhibiting the operation of the power converter when an electric leakage occurs.

In one preferred form of the present invention, if the switch is provided between the generator and the power converter as described above, the above-described electric shock preventing internal combustion engine control means is comprised of a means for controlling the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock in a situation where the leakage detection means detects the occurrence of electric leakage while the switch is closed, and in a situation where the leakage occurrence position identification means determines the occurrence of electric leakage in a circuit existing on the AC generator side as viewed from the switch, and that the rotational speed of the internal combustion engine is allowed to increase to a speed exceeding the speed limit in a situation where the leakage occurrence position identification means determines the occurrence of electric leakage in a circuit existing on the power converter side as viewed from the switch while the switch is opened.

Preferably, the power converter stops producing an output when an electric leakage occurs. In a preferred form of the present invention, therefore, the power converter operation prohibition means for prohibiting the power converter from producing an output when the leakage detection means detects the occurrence of electric leakage is provided.

In this case, the electric shock preventing internal combustion engine control means may be comprised of a means for controlling the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock in a situation where the leakage occurrence position identification means determines the occurrence of electric leakage in the circuit between the AC generator and the power converter while the switch is closed, and in a situation where the leakage occurrence position identification means determines the occurrence of electric leakage in a circuit existing on the AC generator side as viewed from the switch while the switch is opened, and that the rotational speed of the internal combustion engine is allowed to increase to a speed exceeding the speed limit in a situation where the leakage occurrence position identification means determines the occurrence of electric leakage between the switch and the power converter while the switch is opened, and in a situation where the leakage occurrence position identification means determines the occurrence of electric leakage in a circuit on the output side of the power converter, and where the operation of the power converter is prohibited.

The above-described power converter operation prohibition means may be comprised so as to prohibit the power converter from producing an output when the leakage occurrence position determination means determines the occurrence of electric leakage in a circuit on the output side of the power converter while the switch is closed.

If the power converter operation prohibition means comprised so as to prohibit the power converter from producing an output when the leakage detection means detects the occurrence of electric leakage is provided, the electric shock preventing internal combustion engine control means may be comprised of a means for controlling the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock in a situation where the leakage detection means detects an electric leakage while the switch is closed, and in a situation where the leakage occurrence position identification means determines the occurrence of electric leakage in a circuit existing on the AC generator side as viewed from the switch, and that the rotational speed of the internal combustion engine is allowed to exceed the speed limit in a situation where the leakage occurrence position identification means determines the occurrence of electric leakage between the switch and the power converter while the switch is opened, and in a situation where the leakage occurrence position identification means determines the occurrence of electric leakage in a circuit on the output side of the power converter.

In a preferred form of the present invention, a switching-off means for opening the switch when the leakage detection means detects an electric leakage, and maintaining the switch in the opened state while the leakage is being detected is provided. In this case, the electric shock preventing internal combustion engine control means may be comprised of a means for controlling the internal combustion engine so that the rotational speed of the internal combustion engine is limited to a speed limit which is set higher than the lower limit value of the rotational speed of the internal combustion engine necessary for enabling travel of the vehicle and lower than the upper limit value of the rotational speed of the internal combustion engine at which the AC generator generates an output of a voltage value with no risk of electric shock in a situation where the leakage occurrence position identification means determines the occurrence of electric leakage in a circuit existing on the AC generator side as viewed from the switch, and that the rotational speed of the internal combustion engine is allowed to exceed the speed limit in a situation where the leakage occurrence position identification means determines the occurrence of electric leakage in a circuit existing on the power converter side as viewed from the switch.

In a preferred form of the present invention, the above-described leakage detection device has a detection point forming circuit which forms a detection point coupled to each output line of the AC generator through a high-impedance element, and a voltage detection circuit which detects the voltage across the detection point and the ground. The leakage detection means is comprised so as to detect the occurrence of electric leakage in the power supply unit when the voltage detected by the voltage detection circuit becomes equal to or higher than a reference voltage.

If a detection point coupled to each output line of the AC generator through a high-impedance element is provided as described above, and if the voltage across the detection point and the ground is detected, the voltage across the detection point and the ground is substantially at the zero level when no electric leakage occurs in the power supply unit, and becomes equal to or higher than a threshold value when an electric leakage occurs in the power supply unit. Therefore, a condition in which no electric leakage has occurred is detected if the voltage detected between the detection point and the ground is lower than a reference voltage set to a suitable value. Also, a condition in which an electric leakage has occurred is detected if the detected voltage is equal to or higher than the reference voltage.

If a detection point is provided as described above, the voltage appearing between the detection point and the ground when an electric leakage (short-circuit) occurs varies in waveform depending on the position where the electric leakage occurs. That is, when an electric leakage occurs between the AC generator and the power converter, a voltage having a waveform the period of which coincides with that of the output voltage from the AC generator appears between the detection point and the ground. When an electric leakage occurs in a circuit on the output side of the power converter, an AC voltage having a waveform the period of which coincides with that of the AC voltage output from the power converter appears between the detection point and the ground. Therefore, it is possible to determine whether an electric leakage has occurred in the circuit between the generator and the power converter or on the output side of the power converter by determining whether the period of the voltage appearing between the detection point and the ground when the electric leakage is detected coincides with the period of the output voltage of the AC generator or with the period of the AC voltage output from the power converter. If an electric leakage is detected even when the switch is opened, it is possible to determine that the electric leakage has occurred in a circuit existing on the AC generator side as viewed from the switch.

Therefore, the above-described leakage occurrence position identification means may be comprised so as to determine the occurrence of electric leakage in a circuit on the output side of the power converter when detecting a state in which the period of the voltage across the detection point and the ground does not coincide with the period of the output voltage of the AC generator, open the switch when detecting a state in which the period of the voltage across the detection point and the ground coincide with the period of the output voltage of the AC generator, determine the occurrence of electric leakage in the circuit between the switch and the power converter when the leakage detection means detects no electric leakage in the state where the switch is opened, and determine the occurrence of electric leakage in a circuit existing on the AC generator side as viewed from the switch when the leakage detection means detects the electric leakage even in the state where the switch is opened.

The leakage occurrence position identification means may alternatively be comprised so as to determine the occurrence of electric leakage in a circuit on the output side of the power converter when detecting a state in which the period of the voltage across the detection point and the ground coincides with the period of the output voltage of the power converter, open the switch when detecting a state in which the period of the voltage across the detection point and the ground coincides with the period of the output voltage of the AC generator, determine the occurrence of electric leakage in the circuit between the switch and the power converter when the leakage detection means detects no electric leakage in the state where the switch is opened, and determine the occurrence of electric leakage in a circuit existing on the AC generator side as viewed from the switch when the leakage detection means detects the electric leakage even in the state where the switch is opened.

The leakage occurrence position identification means may alternatively be comprised so as to determine the occurrence of electric leakage in a circuit on the output side of the power converter when detecting a state in which the period of the voltage across the detection point and the ground coincides with the period of the output voltage of the power converter, open the switch when detecting a state in which the period of the voltage across the detection point and the ground does not coincide with the period of the output voltage of the power converter, determine the occurrence of electric leakage in the circuit between the switch and the power converter when the leakage detection means detects no electric leakage in the state where the switch is opened, and determine the occurrence of electric leakage in a circuit existing on the AC generator side as viewed from the switch when the leakage detection means detects the electric leakage even in the state where the switch is opened.

If the leakage detection device is comprised as described above, the detection point forming circuit may be coupled to the output lines of the generator in the vicinity of the place in which the leak detection device is provided. Therefore, an electric leakage in the power supply unit can be detected at a position remote from the generator without laying long wiring for connection to the neutral point of the armature coils, as in the case of detecting a short-circuit by grounding the neutral point of the armature coils and detecting a zero-phase current flowing through the neutral point and the grounding circuit. Also, an electric leakage can be detected even in a case where the armature coils of the generator have no neutral point. Further, if the leakage occurrence position identification means is provided as described above, a leakage occurrence position can be located to enable suitable control on the engine when an electric leakage occurs.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A control apparatus for an internal combustion engine driven vehicle equipped with a power supply unit having an AC generator driven by an internal combustion engine for driving the vehicle, and a power converter which converts an output voltage from the AC generator into an AC voltage of a certain frequency, the apparatus comprising:

a leakage detection device having leakage detection means for detecting occurrence of electric leakage in the power supply unit and leakage occurrence position identification means which determines whether an electric leakage has occurred in a circuit between the AC generator and the power converter or has occurred in a circuit on the output side of the power converter when the electric leakage is detected by the leakage detection means; and electric shock preventing control means for performing control for preventing electric shock on at least one of the internal combustion engine and the power converter according to the result of identification performed by the leakage occurrence position identification means, while allowing the rotational speed of the internal combustion engine to increase to a speed at which travel of the vehicle is enabled, when the leakage detection means detects the occurrence of electric leakage.

2. The control apparatus according to claim 1, wherein the electric shock preventing control means includes:

power converter operation prohibition means for prohibiting the power converter from operating when the leakage occurrence position identification means determines the occurrence of electric leakage in a circuit on the output side of the power converter; and electric shock preventing internal combustion engine control means for controlling the rotational speed of the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit between the AC generator and the power converter, and that the rotational speed of the internal combustion engine is allowed to exceed the speed limit in a situation where the leakage occurrence position identification means determines the occurrence of electric leakage in a circuit on the output side of the power converter and where the power converter operation prohibition means prohibits the power converter from operating.

3. The control apparatus according to claim 1, wherein the electric shock preventing control means includes:

power converter operation prohibition means for prohibiting the power converter from operating when the leakage detection means detects the occurrence of electric leakage; and electric shock preventing internal combustion engine control means for controlling the rotational speed of the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit between the AC generator and the power converter, and that the rotational speed of the internal combustion engine is allowed to exceed the speed limit in a situation where the leakage occurrence position identification means determines the occurrence of electric leakage in a circuit on the output side of the power converter, and where the power converter operation prohibition means prohibits the power converter from operating.

4. A control apparatus for an internal combustion engine-driven vehicle equipped with a power supply unit having an AC generator driven by an internal combustion engine for driving the vehicle, and a power converter to which an output from the AC generator is input via a switch, and which converts an output voltage from the AC generator into an AC voltage of a certain frequency, the apparatus comprising:

a leakage detection device having leakage detection means for detecting the occurrence of electric leakage in the power supply unit, and leakage occurrence position identification means for identifying a leakage occurrence position when an electric leakage is detected by the leakage detection means; and electric shock preventing internal combustion engine control means for controlling the internal combustion engine so that the rotational speed of the internal combustion engine is limited to a speed limit set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock when it is determined from a leakage occurrence position identified by the leakage occurrence position identification means and the state of the switch that there is a risk of receiving an electric shock when touching a vehicle body, and that the rotational speed of the internal combustion engine is allowed to increase to a speed exceeding the speed limit when it is determined from a leakage occurrence position identified by the leakage occurrence position identification means and the state of the switch that there is no risk of receiving an electric shock when touching a vehicle body.

5. A control apparatus for an internal combustion engine-driven vehicle equipped with a power supply unit having an AC generator driven by an internal combustion engine for driving the vehicle, and a power converter to which an output from the AC generator is input via a switch, and which converts an output voltage from the AC generator into an AC voltage of a certain frequency, the apparatus comprising:

a leakage detection device having leakage detection means for detecting the occurrence of electric leakage in the power supply unit, and leakage occurrence position identification means for identifying a leakage occurrence position when an electric leakage is detected by the leakage detection means;

power converter operation prohibition means for prohibiting the power converter from operating when the leakage occurrence position identification means determines the occurrence of electric leakage in a circuit on the output side of the power converter while the switch is closed; and electric shock preventing internal combustion engine control means for controlling the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit between the AC generator and the power converter while the switch is closed, and in a situation where the leakage occurrence position identification means determines the occurrence of electric leakage in a circuit existing on the AC generator side as viewed from the switch while the switch is opened, and that the rotational speed of the internal combustion engine is allowed to increase to a speed exceeding the speed limit in a situation where the leakage occurrence position identification means determines the occurrence of electric leakage between the switch and the power converter while the switch is opened, and in a situation where the leakage occurrence position identification means determines the occurrence of electric leakage in a circuit on the output side of the power converter, and where the operation of the power converter is prohibited.

6. A control apparatus for an internal combustion engine-driven vehicle equipped with a power supply unit having an AC generator driven by an internal combustion engine for driving the vehicle, and a power converter to which an output from the AC generator is input via a switch, and which converts an output voltage from the AC generator into an AC voltage of a certain frequency, the apparatus comprising:
 a leakage detection device having leakage detection means for detecting the occurrence of electric leakage in the power supply unit, and leakage occurrence position identification means for identifying a leakage occurrence position when an electric leakage is detected by the leakage detection means;
 power converter operation prohibition means for prohibiting the power converter from operating when the leakage detection means detects the occurrence of electric leakage; and
 electric shock preventing internal combustion engine control means for controlling the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit between the AC generator and the power converter while the switch is closed, and in a situation where the leakage occurrence position identification means determines the occurrence of electric leakage in a circuit existing on the AC generator side as viewed from the switch while the switch is opened, and that the rotational speed of the internal combustion engine is allowed to increase to a speed exceeding the speed limit in a situation where the leakage occurrence position identification means determines the occurrence of electric leakage between the switch and the power converter while the switch is opened, and in a situation where the leakage occurrence position identification means determines the occurrence of electric leakage in a circuit on the output side of the power converter, and where the operation of the power converter is prohibited.

7. A control apparatus for an internal combustion engine-driven vehicle equipped with a power supply unit having an AC generator driven by an internal combustion engine for driving the vehicle, and a power converter to which an output from the AC generator is input via a switch, and which converts an output voltage from the AC generator into an AC voltage of a certain frequency, the apparatus comprising:
 a leakage detection device having leakage detection means for detecting the occurrence of electric leakage in the power supply unit, and leakage occurrence position identification means for identifying a leakage occurrence position when an electric leakage is detected by the leakage detection means; and
 electric shock preventing internal combustion engine control means for controlling the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage detection means detects an electric leakage while the switch is closed, and in a situation where the leakage occurrence position identification means determines the occurrence of electric leakage in a circuit existing on the AC generator side as viewed from the switch, and that the rotational speed of the internal combustion engine is allowed to increase to a speed exceeding the speed limit in a situation where the leakage occurrence position identification means determines the occurrence of electric leakage in a circuit existing on the power converter side as viewed from the switch while the switch is opened.

8. A control apparatus for an internal combustion engine-driven vehicle equipped with a power supply unit having an AC generator driven by an internal combustion engine for driving the vehicle, and a power converter to which an output from the AC generator is input via a switch, and which converts an output voltage from the AC generator into an AC voltage of a certain frequency, the apparatus comprising:
 a leakage detection device having leakage detection means for detecting the occurrence of electric leakage in the power supply unit, and leakage occurrence position identification means for identifying a leakage occurrence position when an electric leakage is detected by the leakage detection means;
 power converter operation prohibition means for prohibiting the power converter from operating when the leakage detection means detects the occurrence of electric leakage; and
 electric shock preventing internal combustion engine control means for controlling the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage detection means detects an electric leakage while the switch is closed, and in a situation where the leakage occurrence position identification means determines the occurrence of electric leakage in a circuit existing on the AC generator side as viewed from the switch, and that the rotational speed of the internal combustion engine is allowed to exceed the speed limit in a situation where the leakage occurrence position identification means determines the occurrence of electric leakage between the switch and the power converter while the switch is opened, and in a situation where the leakage occurrence position identification means determines the occurrence of electric leakage in a circuit on the output side of the power converter.

9. A control apparatus for an internal combustion engine-driven vehicle equipped with a power supply unit having an AC generator driven by an internal combustion engine for driving the vehicle, and a power converter to which an output from the AC generator is input via a switch, and which converts an output voltage from the AC generator into an AC voltage of a certain frequency, the apparatus comprising:
  a leakage detection device having leakage detection means for detecting the occurrence of electric leakage in the power supply unit, and leakage occurrence position identification means for identifying a leakage occurrence position when an electric leakage is detected by the leakage detection means;
  switching-off means for opening the switch when the leakage detection means detects an electric leakage, and maintaining the switch in the opened state while the leakage is being detected; and
  electric shock preventing internal combustion engine control means for controlling the internal combustion engine so that the rotational speed of the internal combustion engine is limited to a speed limit set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit existing on the AC generator side as viewed from the switch, and that the rotational speed of the internal combustion engine is allowed to exceed the speed limit in a situation where the leakage occurrence position identification means determines the occurrence of electric leakage in a circuit existing on the power converter side as viewed from the switch.

10. A control apparatus for an internal combustion engine-driven vehicle equipped with a power supply unit having an AC generator driven by an internal combustion engine for driving the vehicle, and a power converter which converts an output voltage from the AC generator into an AC voltage of a certain frequency, the apparatus comprising:
  a leakage detection device having leakage detection means for detecting occurrence of electric leakage in the power supply unit and leakage occurrence position identification means for identifying a leakage occurrence position when the electric leakage is detected by the leakage detection means; and
  electric shock preventing control means for performing control for preventing electric shock on at least one of the internal combustion engine and the power converter according to the result of identification performed by the leakage occurrence position identification means, while allowing the rotational speed of the internal combustion engine to increase to a speed at which travel of the vehicle is enabled, when the leakage detection means detects the occurrence of electric leakage,
  said electric shock preventing control means includes:
  power converter operation prohibition means for prohibiting the power converter from operating when the leakage occurrence position identification means determines the occurrence of electric leakage in a circuit on the output side of the power converter; and
  electric shock preventing internal combustion engine control means for controlling the rotational speed of the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit between the AC generator and the power converter, and that the rotational speed of the internal combustion engine is allowed to exceed the speed limit in a situation where the leakage occurrence position identification means determines the occurrence of electric leakage in a circuit on the output side of the power converter and where the power converter operation prohibition means prohibits the power converter from operating.

11. A control apparatus for an internal combustion engine-driven vehicle equipped with a power supply unit having an AC generator driven by an internal combustion engine for driving the vehicle, and a power converter which converts an output voltage from the AC generator into an AC voltage of a certain frequency, the apparatus comprising:
  a leakage detection device having leakage detection means for detecting occurrence of electric leakage in the power supply unit and leakage occurrence position identification means for identifying a leakage occurrence position when the electric leakage is detected by the leakage detection means; and
  electric shock preventing control means for performing control for preventing electric shock on at least one of the internal combustion engine and the power converter according to the result of identification performed by the leakage occurrence position identification means, while allowing the rotational speed of the internal combustion engine to increase to a speed at which travel of the vehicle is enabled, when the leakage detection means detects the occurrence of electric leakage,
  said electric shock preventing control means includes:
  power converter operation prohibition means for prohibiting the power converter from operating when the leakage detection means detects the occurrence of electric leakage; and
  electric shock preventing internal combustion engine control means for controlling the rotational speed of the internal combustion engine so that the rotational speed of the internal combustion engine is limited to a speed limit which is set higher than a lower limit value of the rotational speed of the internal combustion engine necessary for enabling travel of the vehicle and lower than an upper limit value of the rotational speed of the internal combustion engine at which the AC generator generates an output of a voltage value with no risk of electric shock in a situation where the leakage occurrence position identification means determines the occurrence of electric leakage in a circuit between the AC generator and the power converter, and that the rotational speed of the internal combustion engine is allowed to exceed the speed limit in a situation where the leakage occurrence position identification means determines the occurrence of electric leakage in a circuit on the output side of the power converter, and where the power converter operation prohibition means prohibits the power converter from operating.

* * * * *